(12) United States Patent
Miseikis et al.

(10) Patent No.: US 12,711,715 B2
(45) Date of Patent: Aug. 18, 2026

(54) TERMINAL DEVICE, SERVICE, AND METHOD FOR GENERATING NOVEL SYNTHETIC VIEWS USING NEURAL NETWORK-BASED VOLUMN RENDERING

(71) Applicant: Sony Group Corporation, Tokyo (JP)

(72) Inventors: Justinas Miseikis, Stuttgart (DE); Dunai Fuentes Hitos, Stuttgart (DE); Lev Markhasin, Tokyo (JP); Diederik Paul Moeys, Stuttgart (DE); Stefan Uhlich, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 208 days.

(21) Appl. No.: 18/613,165

(22) Filed: Mar. 22, 2024

(65) Prior Publication Data

US 2024/0331317 A1 Oct. 3, 2024

(30) Foreign Application Priority Data

Mar. 31, 2023 (EP) .................................... 23165853

(51) Int. Cl.
*G06T 19/00* (2011.01)
*G06F 3/01* (2006.01)
*G06T 15/20* (2011.01)

(52) U.S. Cl.
CPC ............ *G06T 19/006* (2013.01); *G06F 3/013* (2013.01); *G06T 15/20* (2013.01); *G06T 2200/24* (2013.01)

(58) Field of Classification Search
CPC .................................................... G06T 19/006
See application file for complete search history.

(56) References Cited

U.S. PATENT DOCUMENTS

2018/0300954 A1 10/2018 Fu et al.
2019/0238808 A1 8/2019 Bostick et al.
2019/0287164 A1* 9/2019 Eraker ..................... G09G 5/14
2020/0082600 A1* 3/2020 Jones .................... G06T 19/006
2021/0168270 A1 6/2021 Browne
2022/0309623 A1 9/2022 Wu et al.

FOREIGN PATENT DOCUMENTS

EP 2899618 A1 7/2015
WO 2022/172270 A1 8/2022

OTHER PUBLICATIONS

Nazeri et al.,"EdgeConnect: Generative Image Inpainting with Adversarial Edge Learning", arXiv: 1901.00212v3 [cs.CV], Jan. 11, 2019, pp. 1-17.
Pumarola et al., "D-NeRF: Neural Radiance Fields for Dynamic Scenes", arXiv:2011.13961v1 [cs.CV], Nov. 27, 2020, pp. 1-10.
Chen et al., "Vision Transformer Adapter for Dense Predictions", arXiv:2205.08534v2 [cs.CV], May 18, 2022, 25 pages.
Andrew J. Davison, "Real-Time Simultaneous Localization and Mapping with a Single Camera", Proceedings of the 9th IEEE International Conference on Computer Vision, vol. 2, Oct. 13-16, 2003, pp. 1-8.

* cited by examiner

*Primary Examiner* — Shivang I Patel
(74) *Attorney, Agent, or Firm* — XSENSUS LLP

(57) ABSTRACT

A terminal device (1) comprising circuitry configured to obtain a novel synthetic view based on a position and orientation of the terminal device (1) and to display the novel synthetic view to a user of the terminal device (1).

20 Claims, 17 Drawing Sheets

TERMINAL DEVICE, SERVICE, AND METHOD FOR GENERATING NOVEL SYNTHETIC VIEWS USING NEURAL NETWORK-BASED VOLUMN RENDERING

CROSS-REFERENCE TO RELATED APPLICATION

The present application claims priority to European Patent Application No. 23165853.5, filed on Mar. 31, 2023, the content of which is incorporated herein by reference in its entirety.

TECHNICAL FIELD

The present disclosure relates generally to augmented reality (AR) methods and devices and systems for display of AR contents on a display of an electronic device.

TECHNICAL BACKGROUND

Extended reality (XR) describes the perception of enhanced sensory, predominantly visual impressions within a multidimensional environment consisting of a combination of real and computer-generated virtual elements. It is typically mediated to a use by mobile devices such as smartglasses, smartwatches, and smartphones. The term extended reality is a common denominator for virtual (VR), augmented (AR), or mixed reality (MR).

Various techniques related to virtual reality (VR) and augmented reality (AR) have been developed. With VR, a user can watch, for example, a video of a three-dimensional virtual space generated by a computer with highly realistic feeling. Furthermore, with AR, various types of information (for example, a virtual object and the like) can be presented to a user in association with a position of the user in a real space. Augmented reality (AR) technology has revolutionized the way we interact with the digital world, enabling us to seamlessly blend virtual and real environments.

Techniques using an image that merges real-world imagery with imagery created in e.g., a computer are called Hybrid-reality (HR). The concept HR imagery is not limited to just still images, as it can also include moving images such as those created from video streams. Various display devices can be used to showcase HR images, including two-dimensional display devices such as computer monitors, projectors, and smartphone screens. Additionally, an HR system can be based on a device like a microscope, binoculars, or a telescope, where virtual imagery is superimposed over the image captured by the device, with the device's eyepiece being considered as the system's display. HR imagery can also be displayed by a head-mounted display (HMD), which employs various technologies to showcase HR imagery. In a virtual reality (VR) HMD system, the images of a real-world object or scene can be combined with virtual objects or scenes to create an HR image. On the other hand, an AR HMD system can present a virtual object or scene on a transparent screen that naturally mixes the virtual imagery with the view of the real-world scene.

Although there exist techniques for XR devices, it is generally desirable to enhance these techniques.

SUMMARY

According to a first aspect the disclosure provides a terminal device comprising circuitry configured to obtain a novel synthetic view based on a position and orientation of the terminal device and to display the novel synthetic view to a user of the terminal device.

According to a second aspect the disclosure provides a service comprising circuitry configured to generate a novel synthetic view based on a position and orientation of a terminal device and to display the novel synthetic view to the user via a display of the terminal device.

According to a third aspect the disclosure provides a method comprising: obtaining a novel synthetic view based on a position and orientation of the terminal device and to display the novel synthetic view to a user of the terminal device.

According to a fourth aspect the disclosure provides a method comprising: generating a novel synthetic view based on a position and orientation of a terminal device and displaying the novel synthetic view to the user via a display of the terminal device.

According to a further aspect the disclosure provides a computer program executing the methods described above.

Further aspects are set forth in the dependent claims, the drawings and the following description.

BRIEF DESCRIPTION OF THE DRAWINGS

Embodiments are explained by way of example with respect to the accompanying drawings, in which.

DETAILED DESCRIPTION OF EMBODIMENTS

Figure 1:
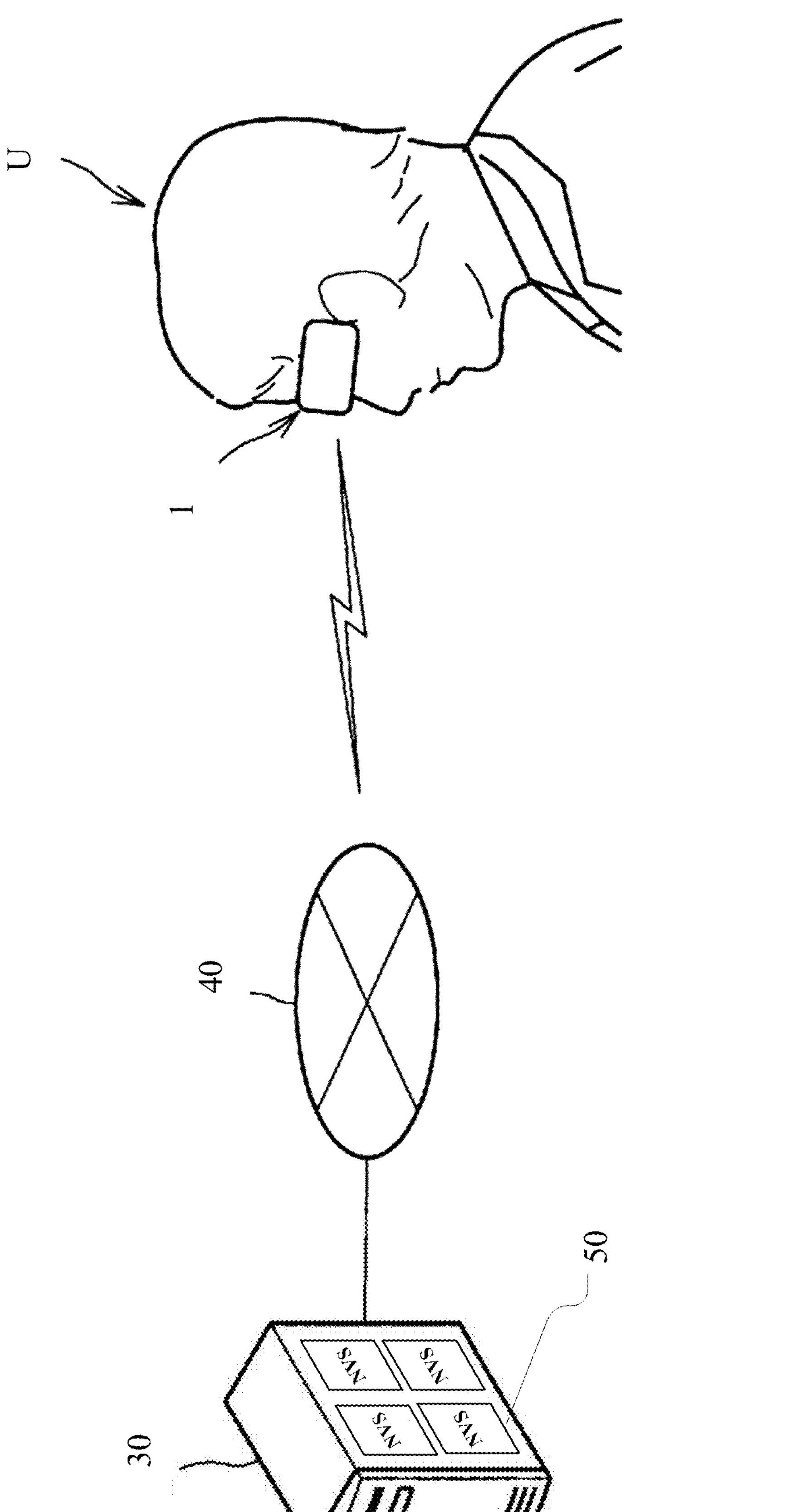
FIG. 1 provides an overview of an information processing system according to an embodiment of the present disclosure.

Before a detailed description of the embodiments under reference of FIG. 1 to FIG. 14, general explanations are made.

The present disclosure provides a terminal device comprising circuitry configured to obtain a novel synthetic view based on a position and orientation of the terminal device and to display the novel synthetic view to a user of the terminal device.

The terminal device may for example be a wearable device such as a smart glasses device, a smartphone, etc.

View synthesis is a technique for synthesizing new views of a scene or object from a set of input images. View synthesis may for example be based on the idea of representing the object scene as a continuous function that can be evaluated at any point in space to produce its appearance, rather than using a discrete set of 3D geometry and texture information.

Circuitry of the terminal device may include a processor, a memory (RAM, ROM or the like), a storage, input means (mouse, keyboard, camera, etc.), output means (display (e.g. liquid crystal, (organic) light emitting diode, etc.), loudspeakers, etc., a (wireless) interface, etc., as it is generally known for electronic devices (computers, smartphones, smart glasses, etc.).

The terminal device may for example be configured with an app that provides a service of novel synthetic view generation to a user.

According to the embodiments the novel synthetic view generation is based on a position and orientation of the terminal device. For example, the terminal device may use techniques such a Simultaneous Localization and Mapping (SLAM) in order to obtain the position and orientation of the terminal device. Such techniques may operate on an image stream of a camera of the terminal device. Alternatively, or in addition, the position and orientation of the terminal device may be obtained based on sensor data of a global positioning sensor (GPS), and, respectively, an inertial measurement sensor (IMS). Sensor fusion techniques may be applied.

The orientation of the terminal device may for example be defined by three angles (pitch, roll, yaw), or for example by a viewing direction and a roll angle.

The position of the terminal device may for example be defined in a global coordinate system, such as a world coordinate system.

This may for example be used in a wide range of industries, from construction and engineering to healthcare and security. By using AR, individuals can visualize objects or spaces that are otherwise hidden, providing a new level of situational awareness and enhancing decision-making capabilities.

In some embodiments the novel synthetic view is generated by a novel synthetic view generator that is configured to generate the novel synthetic view based on the position and orientation of the terminal device. The novel synthetic view generator may for example be implemented by the circuitry of the terminal device. In alternative embodiments, the novel synthetic view generator may also be implemented by an external service, e.g. one or more server computers or a service provider. The novel synthetic view generator may for example be implemented by a Deep Neural Network (DNN). The weights of the DNN may for example represent the knowledge about the object or location.

In some embodiments the novel synthetic view generator represents an object or a specific location such as a room. A novel synthetic view generator may for example represent an object, a specific location, a room, or a shop. For example, the novel synthetic view generator may represent a certain shop in a shopping mall. A user wearing the terminal device is staying in front of the shopping mall and wants to know how long a queue is but doesn't want to go inside. By switching on novel view synthesis the terminal device on and by requesting a novel synthetic view, the user gets an insight into a location such as a desired shop from outside of the shopping-mall. The object or room may for example be associated with a particular position and orientation, e.g. a position and orientation in a global coordinate system, such as a world coordinate system.

In some embodiments the novel synthetic view allows a user of the terminal device to see through walls. For example, the novel synthetic view generator may represent a room that is hidden by a wall or a door or something else from the user's view. A further scenario could be surveillance of children and animals in a house, i.e. looking through walls to see what the child or animal is doing or looking. The technique could also be used to see who is at the door.

The novel synthetic view generator may also be used for drone navigation when producing a first-person view for the drone operator. Walls might in this case be shown by translucent colors or by a mesh grid such that they are also visible for the drone operator. The wall color could further change—e.g. become red for an alarm—in case the drone is coming too close.

Another use case could be to provide multiple layers of view to a user, for example in a shopping mall where a user might look through walls inside the shops and depending on the chosen layer (ground floor, 1st floor etc.). The user might look inside different shops to see how many people are inside a shop, or how long a queue is or, to have a first-person Point Of View of a way they will have to walk to get to their destination. This would make it easier to orient compared to looking at a map of the building. In a gathering there might be several events lined up like a stage behind a stage and the user might choose which stage to watch. Or the additional layers might be the pogo crowd in front of the stage and backstage room.

In some embodiments the novel synthetic view allows a user to have a look inside a product packaging. For example, a use case would be to look through a product packaging to see the product. For this purpose a pre-trained novel synthetic view generator is generated such that a customer could more easily understand how it will look like (e.g., to ensure that it has the right color).

In some embodiments the circuitry is configured to recognize an obstructed area within an image obtained by a camera of the terminal device and wherein the novel synthetic view is representative of the obstruction area. For example, the obstructed area can be replaced with content from the novel synthetic view. The obstructed area may for example be associated with people staying in front of a person wearing the terminal device, e.g. during an event such as a concert, a live event or similar. The embodiment provides to a user an experience as close to be live as possible while removing obstructions from the field of view.

The novel synthetic view may for example represent a scene generated by one or more cameras of the live event, wherein the relative position of the terminal device to the one or more cameras determines a view of the content of the novel synthetic view of the scene.

In some embodiments the novel synthetic view is an updated novel synthetic view. In this way, the novel synthetic view may provide a real-time experience to the user. For example, the novel synthetic view may be generated by a DNN that encodes a continuous volume within the parameters of a deep fully-connected neural network, that requires just a small fraction of storage cost of sampled volumetric representations. Due to the low requirements on network weights (5 MB) a train per scene can be performed in real-time.

The viewing position and the beam direction may for example be obtained based on the position and orientation of the terminal device and based on imaging characteristics of the terminal device. In some embodiments the imaging characteristics comprise at least one of focal length, display size, and number of pixels. The imaging characteristics of the terminal device can also comprise field of view (FOV) information, refresh rate, brightness and contrast.

In some embodiments the terminal device is a smart glasses device. But the embodiments are not restricted to smart glasses and can also comprise, augmented reality headsets, virtual reality headsets, heads-up displays, smart contact lenses or other technologies that offer similar functionality.

In some embodiments the circuitry is configured to obtain, based on the position and orientation of the terminal device, a novel synthetic view for a left eye display and a novel synthetic view for a right eye display.

To create a realistic projection of a novel synthetic view in a user's view, the disparity between the projection of an object in the left eye and the projection of the same object in the right eye needs to be adjusted accordingly. Techniques such as stereoscopic rendering and binocular parallax can be used to create additional 3D effects.

In some embodiments the novel synthetic view is associated with a layer selected from a group of predefined layers. For example, in a shopping mall may have several shops of interest for a user. A virtual menu could provide a list of shops, e.g., in form of a drop-down menu or something else. By input of the user, a desired shop can be chosen, and a novel synthetic view based on the position and orientation of the user is provided.

Another example could be a user staying in front of a shopping mall, wanting to have an insight into a certain shop without entering. by request a list of available shops could be provided and by input of the user the desired shop could be chosen. Then, a novel synthetic view of the desired shop is provided to the user.

It is to be noted, that the layer selection can also occur without the need of a user input, just by looking at the desired entity, for example. The novel synthetic view is then automatically provided to the user.

In some embodiments each layer is associated with at least one novel synthetic view.

One novel view synthesis of a layer is generated from a set of input images. One novel synthetic view generator may for example represent one layer. For each layer, a novel view generator can be stored in e.g., a server of a service provider and send upon request to a user.

In some embodiments the circuitry is configured to select the layer based on the position and orientation of the terminal device and/or based on information obtained by eye tracking.

An example would be a head-up display, where virtual options are displayed as overlays on the user's view of the real world. The user can select options using eye-tracking or head movements.

In this way, the novel synthetic view may automatically adapt to the user's orientation and viewing direction.

In some embodiments the circuitry is configured to provide selection means to the user, the selection means comprising a virtual menu presented to the user or means that analyses voice input of the user.

For example, the virtual menu can be a gesture-based menu, a voice-based menu, spatial menus, object-based menus or similar.

The embodiments also disclose a service comprising circuitry is configured to generate a novel synthetic view based on a position and orientation of a terminal device and to display the novel synthetic view to the user via a display of the terminal device.

The service may for example communicate with a terminal device as described above.

The service may for example be implemented by one or more servers. It may be a service provider. In alternative embodiments, the service may for example be provided at least in part by an application residing on a terminal device such as a smartglasses device or in an external camera.

In some embodiments the circuitry implements a novel synthetic view generator that is configured to generate the novel synthetic view based on the position and orientation of the terminal device.

The novel synthetic view generator may for example be a Deep Neural Network (DNN) or algorithm. In particular an algorithm representing a scene using a fully-connected (non-convolutional) deep network called Neural Radiance Fields for View Synthesis NeRF.

In some embodiments a novel synthetic view generator represents an object or room.

The weights of the DNN represent the knowledge about the object.

The object or room may for example be associated with a particular position and orientation, e.g., a position and orientation in a global coordinate system, such as a world coordinate system.

In some embodiments the novel synthetic view allows a user of the terminal device to see through walls.

For example, the novel synthetic view generator may represent a room that is hidden by a wall from the user's view.

In some embodiments the novel synthetic view allows a user of the look into a product packaging.

For example, the novel synthetic view generator may represent an object that is hidden by a product packaging from the user's view.

In some embodiments the novel synthetic view generator is configured to generate a color value and a color density based on a viewing position and a beam direction.

In some embodiments the circuitry implements multiple novel synthetic view generators, wherein each novel synthetic view generator is associated with a specific layer of a group of predefined layers.

A novel view synthesis generator of a layer may for example be generated from a set of input images and stored in a database. For each layer, a novel synthetic view generator may be stored in a database, the novel synthetic view generator being configured to generate and send, upon request, novel synthetic views to a terminal device.

The embodiments also disclose a method comprising:

obtaining a novel synthetic view based on a position and orientation of the terminal device and displaying the novel synthetic view to a user of the terminal device.

This method may comprise all aspects described above.

This method may for example be executed by a terminal device.

The embodiments also disclose a method comprising:

generating a novel synthetic view based on a position and orientation of the terminal device and displaying the novel synthetic view to the user via a display of the terminal device.

This method may comprise all aspects described above.

This method may for example be executed by a service provider, e.g. by a server computer or a cloud service.

Overview of Information Processing System

FIG. 1 provides an overview of an information processing system according to an embodiment of the present disclosure.

As illustrated in FIG. 1, the information processing system according to the present embodiment includes a terminal device 1, a service provider 30 with several novel synthetic view generators (NVS) 50 (see 230 in FIG. 4 for more details), and a communication network 40.

The terminal device 1 is a head-mounted device and can display various contents (for example, VR contents and AR contents). The terminal device 1 is described in more detail below.

The service provider 30 is a device that manages various types of information. For example, the server 30 stores various contents such as VR contents and AR contents. Furthermore, it stores Deep Neural Networks (DNN) that generate photorealistic novel views of scenes, also called novel view synthesis. The service provider 30 can communicate with other devices via the communication network 40. For example, when a novel view synthesis request is received from another device (for example, the terminal device 1), the service provider 30 transmits the content indicated by the novel view synthesis request to the other terminal device.

The service provider 30 can also perform various controls on other devices (for example, terminal device 1) via the communication network 40. For example, the service provider 30 may perform display control, audio output control, and the like on the terminal device 1.

The communication network 40 is a wired or wireless transmission path for information transmit-ted from a terminal device 1 connected to the communication network 40. For example, the communication network 40 may include a public line network such as a telephone line network, the Internet, and a satellite communication network, various LANs including the Ethernet (registered trademark), a wide area network (WAN), and the like. Further, the communication network 40 may include a dedicated network such as an IP-VPN (Internet Protocol-Virtual Private Network).

Terminal Device

Figure 2:
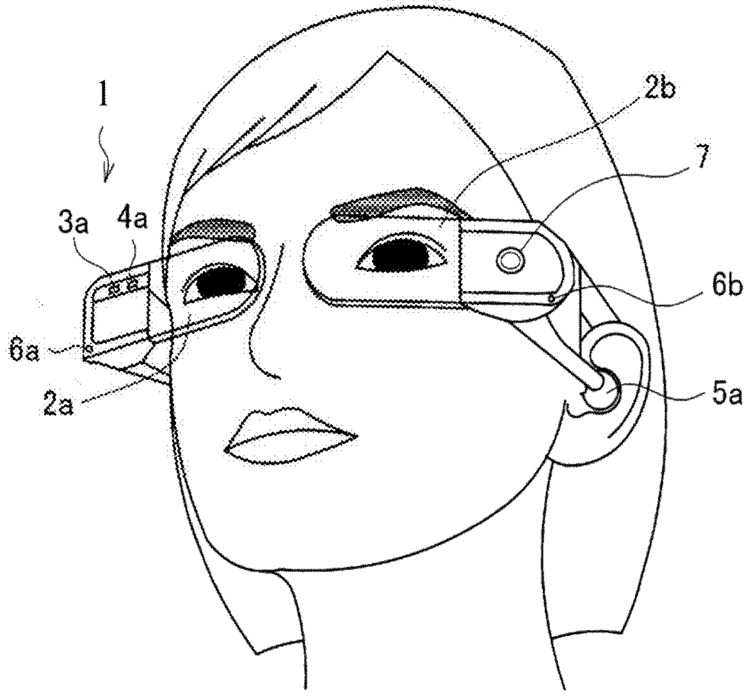
FIG. 2 describes a terminal device according to an embodiment.

FIG. 2 describes a terminal device 1 according to an embodiment.

As illustrated in FIG. 2, the information processing system according to the embodiment is applied to a terminal device 1 that includes a glasses-type display (also known as "smartglasses").

The terminal device 1 according to the embodiment includes a mounting unit with, for example, a frame structure that half circulates from both sides of a head to the rear of the head and is mounted on a user to be put on both of his or her auricles, as illustrated in FIG. 2. Further, the terminal device 1 has a configuration in which a pair of virtual display areas 2*a* and 2*b* for the right and left eyes are disposed immediately in front of both eyes of the user, that is, at positions of lenses of general glasses, in the mounted state illustrated in FIG. 2. For example, liquid crystal panels are used for the virtual display areas 2*a* and 2*b*. By controlling transmittance, a through state, that is, a transparent state or a semi-transparent state, can be realized, as illustrated in FIG. 2. By allowing the display units 2 to be in the through state, there is no inconvenience in normal life even when the user continuously wears the terminal device 1 like glasses.

The display units 2 in the transparent or semi-transparent state can display images such as text or figures so that augmented reality (AR) information can be superimposed on a scene of the real space.

The virtual display areas 2*a* and 2*b* may display and superimpose the augmented reality (AR) information on a captured image of the real space by displaying the captured image of the real space captured by an imaging lens 3*a* on the virtual display areas 2*a* and 2*b*. The virtual display areas 2*a* and 2*b* may reproduce and display content received from an external device (for example, an information processing device such as a digital camera, a video camera, a portable telephone terminal, a smartphone, or a personal computer) by the terminal device 1 or content stored in a storage medium of the terminal device 1.

Here, examples of the content displayed on the virtual display areas 2*a* and 2*b* may include moving-image content of a movie or a video clip, still image content captured with a digital still camera or the like, and data of an electronic book or the like. All kinds of data to be displayed, such as data for computer use such as image data, text data, or spreadsheet data generated with a personal computer or the like by a user or a game image based on a game program, can be assumed as the content.

The imaging lens 3*a* is disposed toward the front side for the user to perform imaging with a view direction of the user set as a subject direction when the terminal device 1 is mounted on the user. A light-emitting unit 4*a* that performs illumination in an imaging direction of the imaging lens 3*a* is disposed. The light-emitting unit 4*a* is formed by, for example, a light-emitting diode (LED). A projector unit 7 is disposed toward the front side so that an image is projected with the view direction of the user set as a projection direction when the terminal device 1 is mounted on the user.

Although illustrated only on the left ear side in FIG. 2, a pair of earphone speakers 5*a* which can be inserted into the right and left ear holes of the user in the mounted state are installed.

Microphones 6*a* and 6*b* that collect external sounds are disposed on the right side of the virtual display area 2*a* for the right eye and on the left side of the virtual display area 2*b* for the left eye.

FIG. 2 merely illustrates an example and diverse structures can be considered for mounting the terminal device 1 on the user. The virtual display areas 2*a* and 2*b* may be formed by a mounting unit generally considered as a glasses-type or head-mounted-type. In the embodiment, at least, the virtual display areas 2*a* and 2*b* may be installed to be close in front of the eyes of the user. One pair of virtual display areas 2*a* and 2*b* may be configured to be installed to correspond to both eyes, and one display unit may also be installed to correspond to one of the eyes.

One earphone speaker 5*a* may be installed to be mounted only on one of the ears rather than using the right and left stereo speakers. For the microphone, one of the microphones 6*a* and 6*b* may also be used.

In FIG. 2, the example in which the projector unit 7 is included is illustrated, but an example in which the projector unit 7 is not included can also be considered. The terminal device 1 can also be considered to have a configuration in which the microphones 6*a* and 6*b* or the earphone speakers 5*a* are not included. A configuration in which the light-emitting unit 4*a* is not included can also be considered.

Here, the most significant feature of normal terminal device 1 is that they are hands-free and no manipulation input devices corresponding to a keyboard, a mouse, and the like are installed. A user's manipulation is performed, for example, with a button or a switch installed in the terminal device 1 or through a sound input, a gesture input, eye-tracking or the like.

An example of an internal configuration of the terminal device 1 and a manipulation example to which the information processing system according to the embodiment is applied will be described in sequence below.

Figure 3:
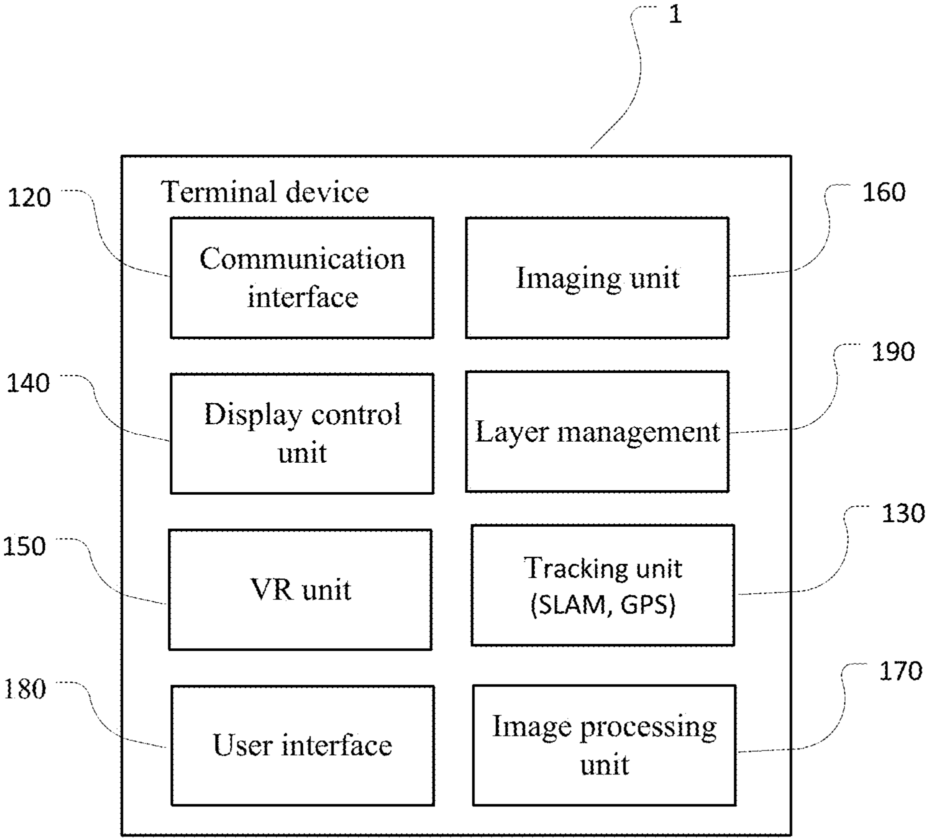
FIG. 3 is a functional block diagram illustrating an exemplary configuration of a terminal device according to the embodiment.

FIG. 3 is a functional block diagram illustrating an exemplary configuration of terminal device 1 according to the embodiment. As shown in in FIG. 3, the terminal device 1 includes a control unit, a communication interface 120, a tracking unit 130, a display control unit 140, a VR unit 150, an imaging unit 160, an image processing unit 170, a layer management 190, and a user interface 180.

The communication interface 120 performs transmission and reception of data with an external device, where the data may be any data necessary for implementing the processes described with reference to the embodiments described below in more detail. According to the present embodiment, the external device is a server of e.g. a service provider 30. The data transmitted or received via the communication interface 120 may be position data (position information provided from the tracking unit 130), image data (images captured by the imaging unit 160), audio data, or the like. The communication interface 120 may, for example, be implemented by the communication unit 26 described with reference to FIG. 16.

The tracking unit 130 is configured to detect the position information of the terminal device 1. Here, the position information of the terminal device 1 may be detected through any method. For example, a positioning sensor (for example, global positioning system (GPS) sensor, see 21 in FIG. 9) may generate positioning data (the latitude and the longitude) of the terminal device 1 in the real space on the basis of an arrival period of time (a difference between a transmission time and a reception time) of a signal received from each GPS satellite by the terminal device 1. In addition, a so-called simultaneous localization and mapping (SLAM) technology may also be used in self-position estimation of the terminal device 1. SLAM refers to a technology that executes localization and the creation of an environment map in parallel by utilizing an imaging unit such as a camera, various sensors, an encoder, and the like. As a more specific example, in SLAM (in particular, visual SLAM), a three-dimensional shape of a captured scene (or a subject) is successively reconstructed on the basis of a moving image captured by an imaging unit. Then, creation of a surrounding environmental map and estimation of the position and posture of an imaging unit (and consequently, the terminal device 1) in the environment are performed by associating a reconstruction result of the captured scene with a detection result of the position and posture of the imaging unit. Note that, for example, various types of sensors such as an acceleration sensor or an angular velocity sensor are provided in the terminal device 1, and thereby it is possible to estimate the position and posture of the imaging unit as information indicating a relative change on the basis of a detection result of the sensors. Obviously, as long as the position and the attitude of the imaging unit can be estimated, the method is not necessarily limited only to a method based on the detection results of various sensors such as an acceleration sensor and an angular velocity sensor. SLAM is described in detail in, for example, "Real-Time Simultaneous Localization and Mapping with a Single Camera" (Andrew J. Davison, Proceedings of the 9th IEEE International Conference on Computer Vision Volume 2, 2003, pp. 1403-1410).

The display control unit 140 manages and controls the display information on the virtual display areas 2*a* and 2*b*. The display control unit receives input from the communication interface, and then processes and displays this information on the virtual display areas 2*a* and 2*b*. The display control unit 140 may be, for example, a display that corresponds to the shape of the terminal device 1. For example, of the above-described examples, the terminal device 1 can include, for example, a display with a shape corresponding to a lens portion of glasses. Alternatively, the display control unit 140 may be a projection device that projects an image on an object.

The VR unit 150 generates, manages and triggers displaying of any virtual content that is displayed to the user. For example, the VR unit 150 may place a novel synthesized view which is provided by a service provider (30 in FIG. 4), in the reference system of the terminal device.

The imaging unit 160 may be a camera module that captures an image. The imaging unit 160 includes at least one of a time-of-flight (ToF) camera, a stereo camera, a monocular camera, an infrared camera, and other cameras. The imaging unit 160 images a real space using an image sensor such as a charge coupled device (CCD) or a complementary metal oxide semiconductor (CMOS) and generates a captured image. A series of captured images generated by the imaging unit 160 forms a video. The imaging unit 160 may not necessarily be in a part of the terminal device 1. For example, an imaging device connected to the terminal device 1 in a wired or wireless manner may be specified as the imaging unit 160. The imaging unit 160 may include a depth sensor that measures a distance between the imaging unit 160 and a subject for each pixel. Depth data output from the depth sensor can be used to recognize an environment in an image obtained by imaging the real space, as will be described below.

The image processing unit 170 is a component in a terminal device that is responsible for processing images and graphics to be displayed on the terminal device's display unit 2. Furthermore, the image processing unit can perform a range of functions, such as correcting distortion caused by the lenses in the terminal device, adjusting the brightness and contrast of the images to optimize the viewing experience, and enhancing the resolution of the images to reduce pixelation and improve clarity. the image processing unit 160 can also perform real-time processing of the images to support features such as eye tracking, gesture recognition, and head tracking, which are commonly used in virtual and augmented reality applications. Furthermore, the image processing unit 160 may perform image recognition to identify possible obstructions as an object, a wall, a product packaging 400 or other obstructed areas and send this information as a request for a novel synthetic view to a service provider 30.

The layer management 190 creates a selection of a list of entities which is provided by the service provider 30. For example, if a user wearing the terminal device 1 and is located in front of a shopping mall, which is equipped with an information processing system according to the embodiment, a list of available shops based on imaging characteristics, position and orientation of the terminal device 1 will be send by the service provider 30 on request of the terminal device 1. A user is now able to select a desired shop. A layer can mean all layers within a three-dimensional reference system. A user wearing a terminal device 1 could choose between shops which are located next to each other in x- and y-direction, but also shops located in z-direction. This technique is not limited to shops and can comprise rooms, levels, floors, rows and other entities where perspective vision can be of benefit.

The user interface 180 processes input of a user. This input can be haptic, e.g. by switches, by sound, e.g. voice input or optical, e.g. by viewing direction. The user input can further be made by eye tracking for example. The user input determines for example for which entity or layer a novel view synthesis should be generated.

Service for Providing Novel Synthetic Views to a Terminal Device User

Figure 4:
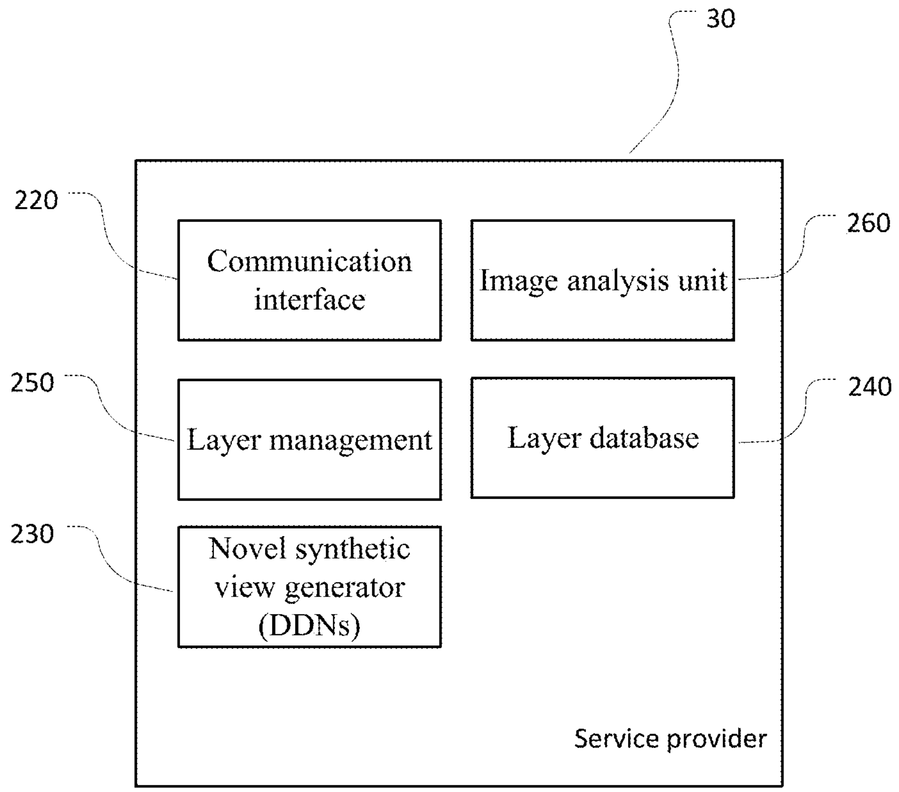
FIG. 4 is a functional block diagram illustrating an exemplary configuration of a service provider according to the embodiment.

FIG. 4 is a functional block diagram illustrating an exemplary configuration of a service provider 30 according to the embodiment. As shown in in FIG. 4, the service provider 30 includes a communication interface 220, a novel synthetic view generator 230, a layer database 240, a layer management 250, and an image analysis unit 260.

The communication interface 220 is a communication interface that mediates communication by the service provider with other devices. The communication interface 220 supports any wireless communication protocol or any wired communication protocol and establishes communication connection with another device, such as the terminal device 1.

The novel synthetic view generator 230 generates a novel synthetic view of an entity such as a shop, a room or the like. The input for generating the novel synthetic view is a single continuous 5D coordinate (spatial location (x, y, z) and viewing direction (θ, φ)) and the output is a volume density and view-dependent emitted radiance at a spatial location. Furthermore, the generation of the novel synthetic view includes the position, orientation and imaging characteristics of the terminal device 1. The novel view is then synthesized by querying 5D coordinates along camera rays and classic volume rendering techniques are used to project the output colors and densities into an image. The novel synthetic view created this way is then sent to the terminal device 1.

The layer database 240 contains a list of available entities, like shops in a shopping mall or the like, if the information processing system requires a selection to be done by a user. A layer can mean all layers within a three-dimensional reference system. This technique is not limited to shops and can comprise rooms, levels, floors, rows and other entities where perspective vision can be of benefit.

The layer management 250 may create a selection of a number of entities such as a list of entities on request of e.g. a terminal device 1. For example, if a terminal device 1 sends a request regarding a list of available shops in a shopping mall, a list of available shops based on imaging characteristics, position and orientation of the terminal device 1 will be send to the terminal device 1. A user is now able to select a desired shop. A layer can mean all layers within a three-dimensional reference system. The shops are stored in a way that a user could choose between shops which are located next to each other in x- and y-direction, but also shops located in z-direction. This technique is not limited to shops and can comprise rooms, levels, floors, rows and other entities where perspective vision can be of benefit.

The image analysis unit 260 acquires a captured image and of the imaging unit 160 and processes the images that are to be displayed on the virtual display areas 2*a* and 2*b*. The imaging analysis unit 260 performs tasks as image distortion correction, tracking, e.g. terminal device may incorporate sensors to track the user's head movements in order to adjust the displayed images accordingly. The imaging analysis unit 260 may process the sensor data to determine the user's position and orientation, and then adjust the displayed images in real-time to maintain the illusion of a stable virtual environment. Furthermore, the image analysis unit 260 may be responsible for rendering the two separate images (one for each eye) and ensuring that they are properly aligned and synchronized with the user's head movements, a process which is called stereoscopic rendering. This technique may also create an illusion of depth in the displayed images. The imaging analysis unit may be responsible for decoding the video stream and rendering it for display on the terminal device screen. For the present embodiments the imaging analysis unit 260 may be in particular configured to detect obstructed areas, for example a crowded area during a live event or a product packaging 400 preventing a user from seeing the actual product, which in a next step can be replaced by a novel view synthesis.

It should be noted that in the example of FIG. 4 a server is shown which provides the service to the head mounted display. In alternative embodiments, the service might be provided by a cloud service, the cloud service comprising multiple electronic devices.

It should also be noted that the functionality which is described in FIG. 4 as part of the service may at least in part be located in the terminal device. For example, an app running on the terminal device may realize such functionality. For example, the functionality of the layer management 250, the novel synthetic view generation 230, and/or the image analyzing 260 of the service provider may completely or in part be performed by the terminal device. The novel synthetic view generator may for example be provided by the service provider for download. The terminal device may download the model from the server and execute the novel synthetic view generation on its own.

Novel Synthetic View Generation

The embodiments apply view synthesis to provide new views to the user of a terminal device. For example, a novel synthetic view generator located at a service provider (230 in FIG. 4), or, alternatively, within a head mounted display, may be configured to generate a novel synthetic view of an entity such as a shop, a room, a product or the like. The terminal device may provide the novel synthetic view as an enhanced view to a user wearing the terminal device.

For example, the AR technology described in the embodiments below in more detail provides the user the ability to see through obstructions, such as walls or other physical barriers. This may be applied in a wide range of application, from construction and engineering to healthcare and security. By using AR, individuals can visualize objects or spaces that are otherwise hidden, providing a new level of situational awareness and enhancing decision-making capabilities.

As an example, the embodiments may rely on novel viewpoint synthesis neural networks as shown in "Neural Radiance Fields" (NeRF) technique for view synthesis as disclosed by B. Mildenhall, P. P. Srinivasan, M. Tancik et al. in "NeRF: Representing Scenes as Neural Radiance Fields for View Synthesis", (2020). arXiv.

In NeRF, a deep neural network is trained to predict the radiance (color and density) and occupancy of a 3D point in the scene given its 3D location. The network is trained on a set of input images captured from different viewpoints, which are used to optimize the parameters of the network.

Once the network is trained, it can be used to synthesize or render (e.g. volume rendering) new views of the scene from arbitrary viewpoints by evaluating the radiance field at the corresponding 3D points. The embodiments described below synthesize or render (e.g. volume rendering) new views of a scene from the viewpoint of the user wearing a head mounted display. This allows for highly realistic and detailed synthesis of novel views of a scene, including views from inside or behind objects, which is not possible with traditional view synthesis techniques.

One of the key advantages of NeRF is its ability to handle highly complex scenes with varying lighting conditions and dynamic objects. This is because the neural network can learn to model the scene's appearance and lighting conditions as a continuous function, rather than relying on a discrete set of geometry and texture information.

The novel synthetic view generator is also able to generate novel synthetic views in real-time. It encodes a continuous volume within the parameters of a deep fully-connected neural network, that requires just a small fraction of storage cost of sampled volumetric representations. Due to the low requirements on network weights (~5 MB) the novel synthetic view generator can be trained with consecutive images, leading to a real-time processing and thus, real-time imaging.

In a case where a scene is assumed not to be static, meaning that the appearance and geometry of the scene are not fixed and change over time, dynamic NeRF (D-NeRF) may be used for generating novel synthetic view.

For this purpose, a recurrent neural network (RNN) that models the temporal evolution of the scene is used. The RNN takes as input the current camera pose and previous scene representation, and outputs the updated scene representation. During training, the model is trained to minimize the difference between the rendered images and the ground truth images. The rendered images are generated by rendering the scene representation using the current camera pose.

At inference time, the model can be used to generate novel views of the scene at any point in time. The camera pose and the desired time step can be specified, and the model will generate the corresponding image.

This technique is for example shown in "D-NeRF: Neural Radiance Fields for Dynamic Scenes" disclosed by Pumarola et al. (2020) arXiv.

Also, other types of novel viewpoint synthesis neural networks may be suitable for image generation in which a neural network is trained as Multiplane Image (MPI) View Synthesis, Generative Query Network (GQN), DeepVoxels or the like.

In the following some examples of applications of the information processing system according to an embodiment of the present disclosure are explained below.

Looking Through Walls

One possible application of a novel synthetic view generator (e.g., NeRF) in augmented reality (AR) is to enable the user to look through walls. To achieve this, the system is trained on a dataset of images captured behind the wall, from various viewpoints. The synthetic view model is then used to reconstruct the 3D scene behind the wall from arbitrary viewpoints, in particular from the viewpoint of the wearer of a terminal device.

Once the 3D scene is reconstructed, it can for example be overlaid onto the real-world view seen through an AR headset. This enables the user to see a virtual representation of the scene behind the wall, as if the wall was not there. The virtual representation is preferably aligned with the real-world view, which could be achieved through the use of tracking technologies, such as simultaneous localization and mapping (SLAM).

Using synthetic view generation with AR in this way provides a powerful tool for visualizing and interacting with objects and environments that would otherwise be hidden or difficult to access.

(Shopping Mall)

A possible use of a novel synthetic view generator and AR is to get a live insight into a building such as a shopping mall. To achieve this, a dataset of images of specific places within the mall is captured from various viewpoints inside the mall by the service provider. This dataset is then used by the service provider to train a novel synthetic view generator (e.g. a NeRF model) which is configured to reconstruct a 3D scene of a shop within a mall. This model can then be used by the service provider to produce novel synthetic views of a shop (see S140' in FIG. 7 described below) upon request by a user or may provide the model to the user for download.

Furthermore, it is also possible that a novel synthetic view generator is configured to reconstruct a 3D scene of smaller entities of a shop, e.g., different rooms or locations within a shop.

Once the novel synthetic view generator (e.g. NeRF model) is trained, it is used in conjunction with AR technology to provide a live insight into the mall. Users who wear AR headsets can look around the mall, with the novel synthetic view generator overlaying a virtual representation of specific places within the shopping mall (such as shops, etc.) onto their view. This virtual representation may be updated in real-time based on the user's position and orientation, which could be achieved through the use of tracking technologies such as SLAM.

Figure 5:
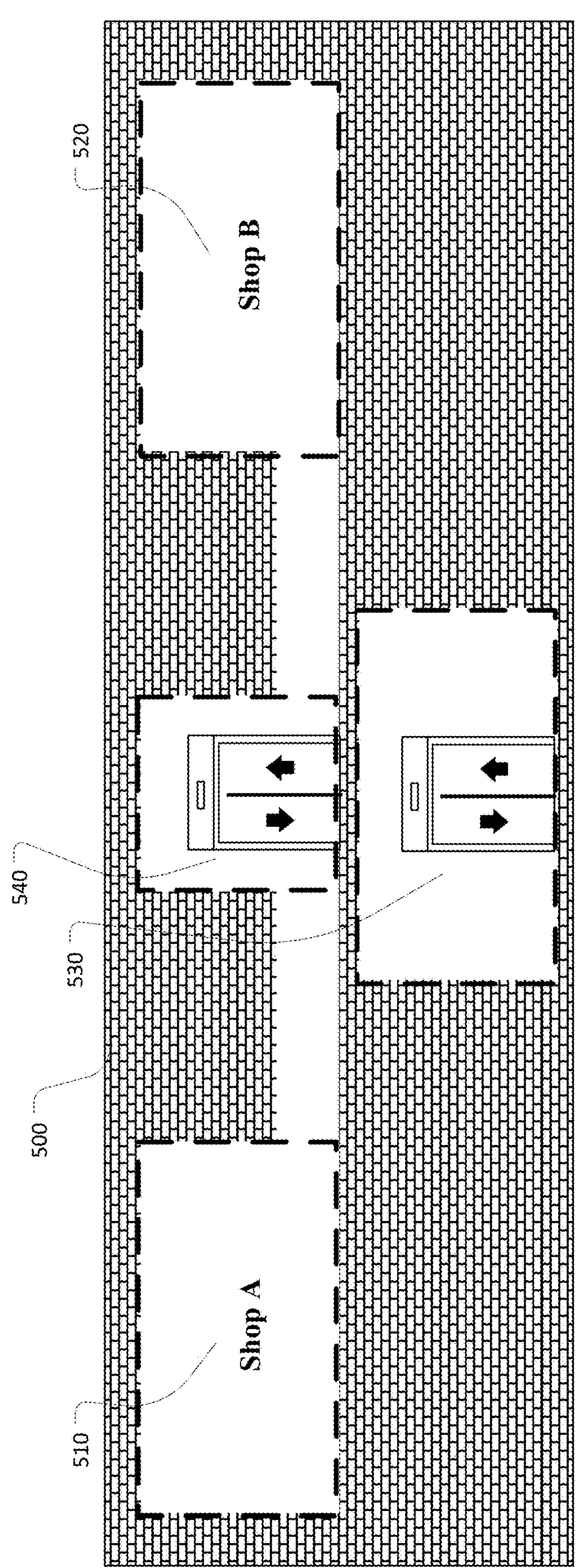
FIG. 5 shows an embodiment of novel synthetic view generation in the framework of a shopping mall.

FIG. 5 shows an embodiment of novel synthetic view generation in the framework of a shopping mall. A shopping mall 500 comprises two floors, which are connected via an elevator. On the upper floor two shops are located, shop A and shop B. A terminal device 1 represents the view of a user looking at the shopping mall from a position outside of the shopping mall. Under normal circumstances the view of a user into the shops would be blocked by the walls of the shopping mall. Here, the view of a user is shown when a novel view synthesis is displayed in the virtual display areas 2*a* and 2*b*. It shows a novel synthetic view of shop A 510, a novel synthetic view shop B 520 and a novel synthetic view of the entrance hall 530 and entrance hall 540 relative to the position of the user to the respective entities. The user is able to see the generated novel synthetic views of shop A 510 or shop B 520 and/or the entrance 530, 540 on different floors in the reference system of the user's position. The novel synthetic views of the different locations are determined based on the position and orientation of the terminal device 1 respective to the shopping mall 500.

In the embodiment of FIG. 5 all specific places within the shopping mall 500 that are modelled by a respective novel synthetic view generator are automatically presented to the user. That is, a novel synthetic view of a shop 510, 520 (or other specific location for which a model exists) is automatically received by the terminal device when the user comes close or enters a shopping mall 500.

It an alternative embodiment (see FIGS. 6 and 7 below), a service provider may present a list of available places (e.g. shops, etc.) to the user, the user selects from the list of available places a specific place that the user is interested in, and the service provider 30 generates and sends to the user a novel synthetic view only for that specific place that has been selected by the user. In yet another embodiment, a different layer, e.g., a floor of the shopping mall 500 might be chosen by input of the user, and the service provider generates novel synthetic views only for that place that are associated with the layer that has been selected by the user.

In yet an alternative embodiment, the system may be configured to present to the user, from a long distance, only an outline view of the position of various locations (e.g. shops) for which models exist, without the need to display novel view synthesized views for each of the location at this early stage. Whereas from a closer distance, when a more detailed view is appropriate, the terminal device 1 may present to the user synthesized views of the locations for which models exist.

Figure 6:
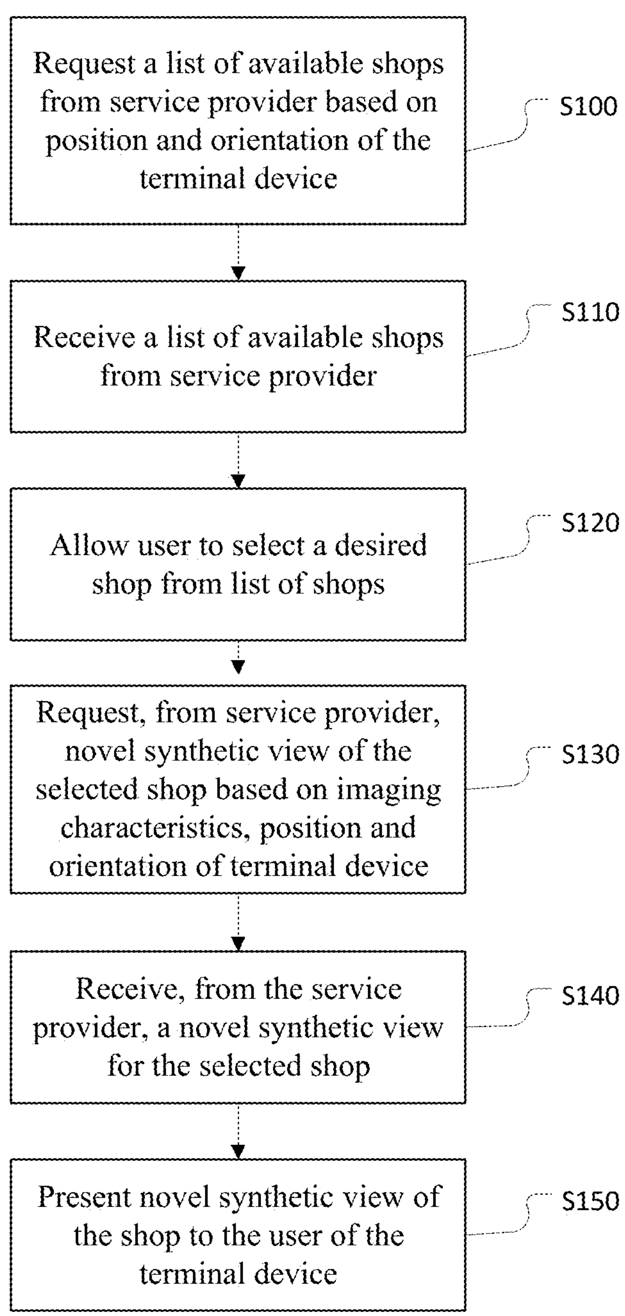
FIG. 6 is a flow chart of a process of novel synthetic view generation from the perspective of the terminal device.

FIG. 6 is a flow chart of a process of novel synthetic view generation from the perspective of the terminal device (1 in FIGS. 1, 2 and 3). In step S100 the user, by means of terminal device, requests a list of available shops of a shopping mall from the service provider (30 in FIGS. 1 and 3). This request may be based on position and orientation the terminal device. For example, the terminal device may send its position and orientation to the service provider in order to allow the service provider to compile a list of appropriate shops that are within the scope of view of the user (see S210 in FIG. 7). In the following step S110 the terminal device receives a list of available shops from service provider 30 that are available for the position and orientation of the user. The next step S120 allows the user to select a desired shop from the list of shops. When the user has selected a desired shop from the list, the terminal device requests, in a next step S130, from the service provider 30, a novel synthetic view of the selected shop based on imaging characteristics, position and orientation of the terminal device. The service provider then generated a novel synthetic view for the selected shop as described with regard to FIG. 7 below in more detail. As a next step S140 the terminal device receives from the service provider 30, the novel synthetic view for the selected shop. In step S150, this novel synthetic view of the shop is then, presented to the user of the terminal device.

Figure 7:
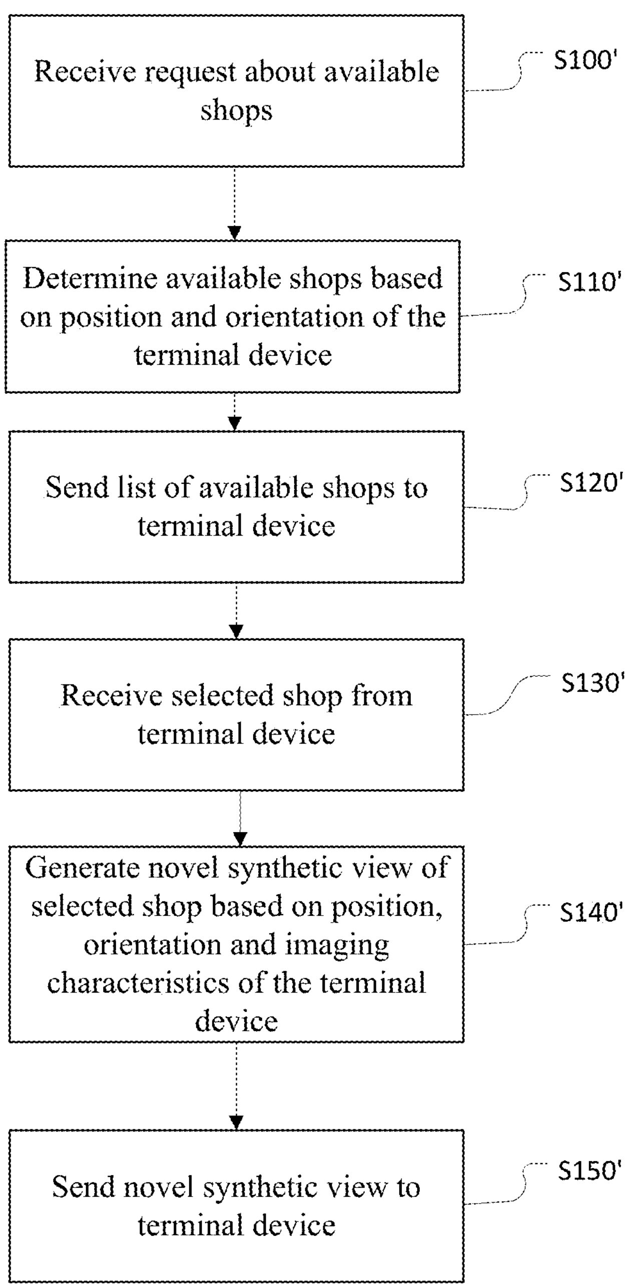
FIG. 7 is a flow chart of a process of novel synthetic view generation from the perspective of a service provider.
Figure 8:
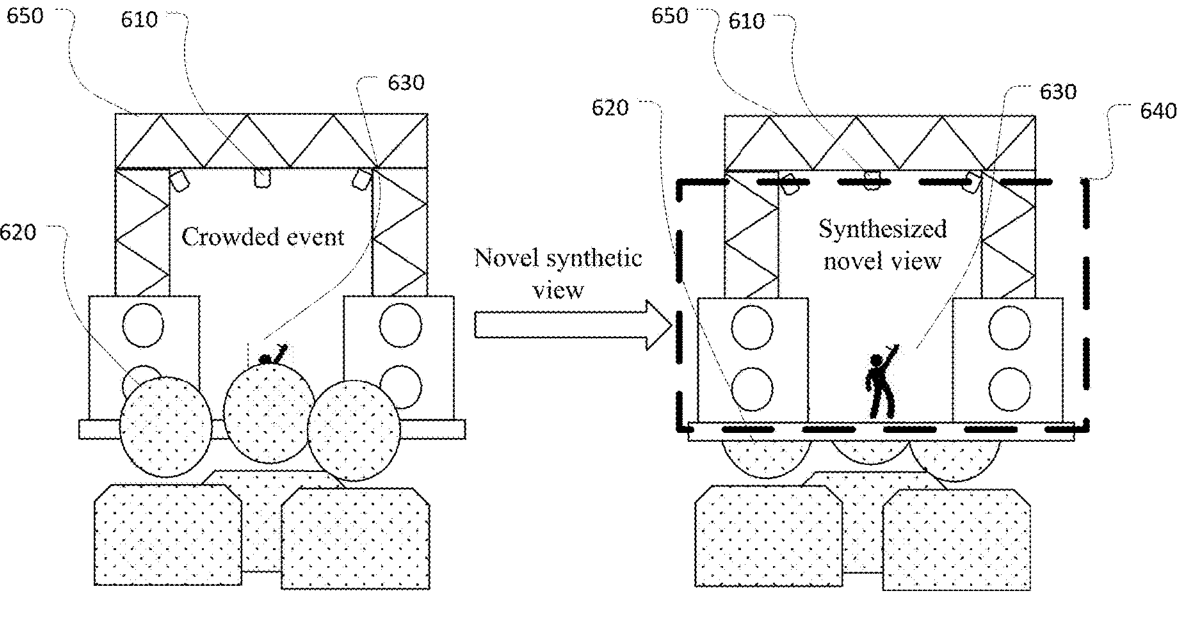
FIGS. 8A and 8B show an embodiment of novel synthetic view generation in the framework of a live event.

It should be noted that in the embodiment of FIG. 6, the user selects from a list of available shops. In alternative embodiments the service provider may compile a list of FIG. 7 is a flow chart of a process of a novel synthetic view generation from the perspective of the service provider (30 in FIG. 1). In a first step S100' the service provider receives a request about available shops from the terminal device. In a next step S110' the service provider 30 determines available shops based on the position and orientation of the terminal device. In the following step S120' the service provider sends list of available shops to the terminal device. In step 130' service provider 30 receives the selected shop from terminal device. In the next step S140' service provider generates a novel synthetic view of the selected shop based on the position, orientation and imaging characteristics of the terminal device. In a last step S150' the service provider sends novel synthetic view to the terminal device.

Determining available shops based on the position and orientation of the terminal device may for example comprise defining a (virtual) field of view based on the position and orientation (and, optionally, based on characteristics of the terminal device). The service provider may then decide whether or not a specific shop falls within the field of view of the terminal device and add to the list of shops only those shops which actually fall within the field of view of the terminal device.

(Live Event)

FIGS. 8A and 8B show an embodiment of novel synthetic view generation in the framework of a live event. A user wearing a terminal device as described in FIGS. 3 to 4 is watching a live event (here a concert) that is happening on a stage 650.

As shown in FIG. 8*a* which shows a real view of the user, the user's view onto a stage 650 is partially blocked by three people 620. Due to this blocking of the view the artist 630 is only partially visible to the user. A service provided captures the live event by multiple cameras 610 from different viewpoints. Based on the images captured by cameras 610 the service provider trains a novel synthetic view generator (e.g. a D-NeRF model) time component. The novel synthetic view generator is thus configured to generate views of the live event from arbitrary viewpoints.

FIG. 8*b* shows a user's view on the stage 650 after activating novel synthetic view generation. The terminal device performs image recognition on images taken by a camera of the terminal device to identify if the user's view is obstructed. If the image recognition provides the result that the user's view on stage 650 is obstructed, novel synthetic view presentation is switched on in the terminal device. A request is sent to a service provider 30 to generate a novel synthetic view of the live event based on the position, orientation and imaging characteristics of the user's terminal device. A novel synthetic view of stage 650 is then generated by the service provider based on the parameters of the terminal device and sent to the user's terminal device. The novel synthetic view 640 (dashed rectangle) of the live event generated by the service provider is presented to the user. In this way, the user is enabled to see the artist 630 on stage 650 as if the view on the stage 650 were unobstructed. This embodiment provides an experience to the user which is as close to a live event as possible while removing obstructions from the field of view.

Figure 9:
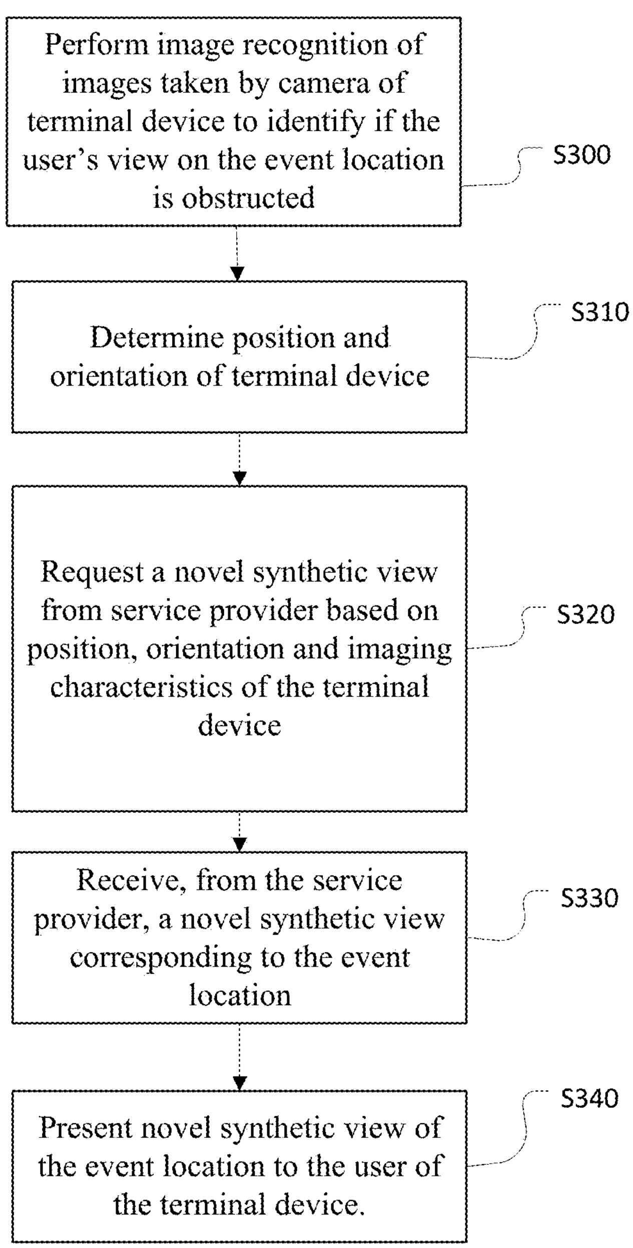
FIG. 9 is a flow chart of a process of novel synthetic view generation in the framework of a live event, from the perspective of the terminal device.

FIG. 9 is a flow chart of a process of novel synthetic view generation in the framework of a live event, from the perspective of the terminal device (1 in FIGS. 1, 2 and 3). In a first step S300 the terminal device performs image recognition on images taken by a camera of the terminal device to identify if the user's view on the event location is obstructed. In a next step S310 the position and orientation of the terminal device is determined. If it has been determined in step S300 that the user's view is obstructed, in step S320, the terminal device requests a novel synthetic view from a service provider based on the position, orientation and imaging characteristics of the terminal device. In step S330 the terminal device receives from the service provider a novel synthetic view corresponding to the event location. In step S340 the novel synthetic view of the event location is presented to the user of the terminal device.

Figure 10:
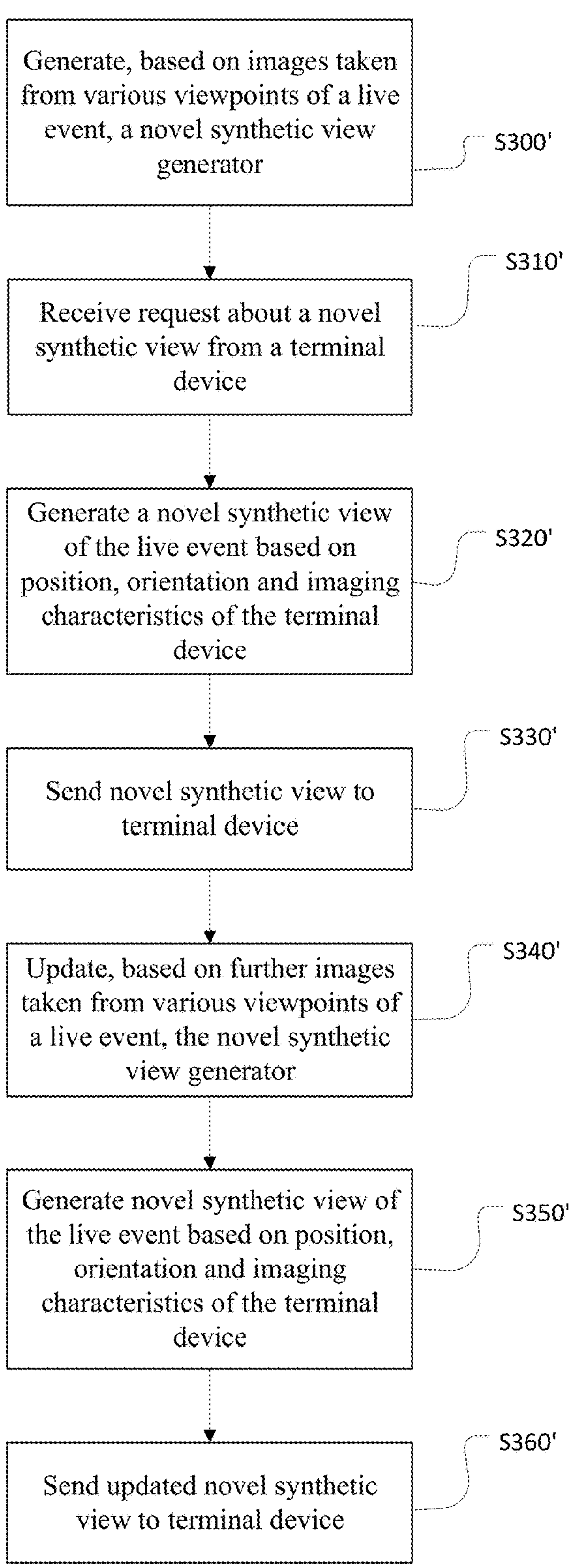
FIG. 10 is a flow chart of a process of a novel synthetic view generation in the framework of a live event, from the perspective of the service provider.

FIG. 10 is a flow chart of a process of a novel synthetic view generation in the framework of a live event, from the perspective of the service provider (30 in FIG. 1). In a first step S300' the service provider generates, based on images taken from various viewpoints of a live event, a novel synthetic view generator of an event location of a live event. In a next step S310' the service provider receives a request about a novel synthetic view from a terminal device. In the next step S320' a novel synthetic view of the live event is generated based on position, orientation and imaging characteristics of the terminal device and in a next step S330' sent to the terminal device. In the following step S340' the novel synthetic view generator is updated based on further images taken from various viewpoints of the live event. In the following step S350' the updated novel synthetic view of the live event is generated based on position, orientation and imaging characteristics of the terminal device and in a last step S360' the updated novel synthetic view is sent to the terminal device In the embodiment described above image analysis is used to determine if the user's view on the stage is obstructed or not and to turn on novel synthetic view generation if needed. In alternative embodiments, the obstructed area can be identified and replaced with content from the novel synthetic view. In this way, the novel synthetic view generation may be limited to only those pixels that are needed the fill the area of obscured view.

(Looking Into a Product Packaging)

Figure 11:
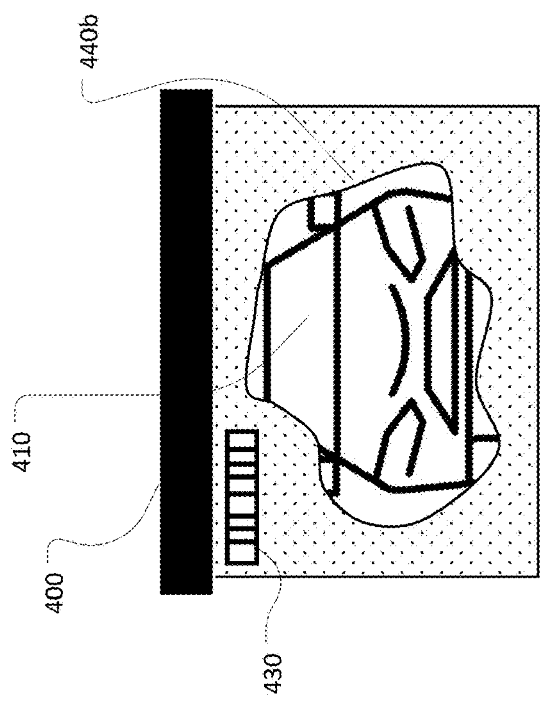
FIGS. 11A and 11B show an embodiment of novel synthetic view generation in the framework of a user (virtually) looking into a closed product packaging.
Figure 11:
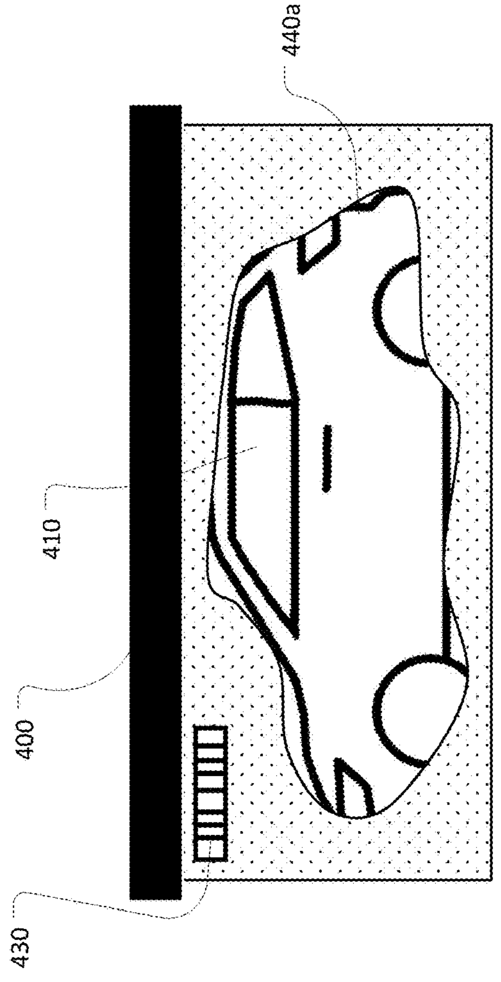

FIGS. 11A and 11B show an embodiment of novel synthetic view generation in the framework of a user (virtually) looking into a closed product packaging. A novel synthetic view generator (not shown in FIG. 11) has been trained to represent a product within the product packaging (here, a toy car 410). The novel synthetic view generator allows to generate novel synthetic views of the toy car 410 from arbitrary positions and viewing angles.

FIG. 11A shows, according to a first exemplifying orientation, a product packaging 400 with a toy car 410 in it. The product packaging 400 is still closed so that the product packaging 400 prevents the toy car 410 from being seen by a user. A user is wearing a terminal device (1 in FIGS. 2 to 4) according to the embodiments described in FIGS. 2 to 4 above and holds the product packing in his hands. The terminal device is configured to show a novel synthetic view of the toy car 440*a* (side view) within the product packaging 400 to the user. The terminal device is configured to read a barcode 430 and to determine what kind of product is inside the product packaging. Still further, the terminal device is configured to determine the position and orientation of the product packaging within the coordinate system of the terminal device. Based on the information obtained from the barcode the appropriate novel synthetic view generator is selected which is configured to produce views of the identified product, here the toy car 410. The novel synthetic view generator generates a novel synthetic view of the toy car 410 based on the relative position and orientation of the product and this novel synthetic view is presented to the user. By means of this novel synthetic view the user is able to (virtually) see into the product packaging and to (virtually) inspect the toy car 410 inside the product packaging as if the user could physically look into the product packaging.

FIG. 11B shows, according to a second exemplifying orientation, the product packaging 400 with the toy car 410 in it. In FIG. 11B the user has turned the product packaging 400, here e.g. from a side view of the product packaging as shown in FIG. 11A to a front view of the product packaging. The terminal device is configured to determine the new position and new orientation of the product packaging within the coordinate system of the terminal device. A novel synthetic view of the toy car 440*b* (front view) is generated based on the new position and orientation of the product packaging within the coordinate system of the terminal device.

Figure 12:
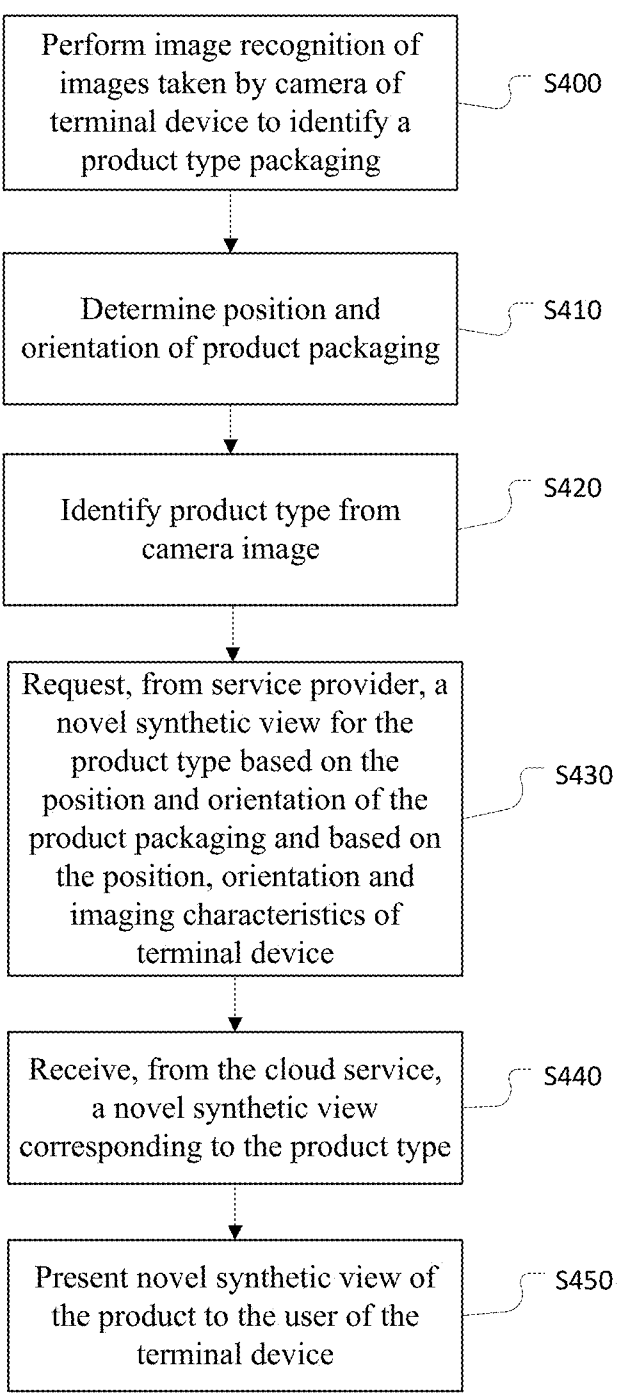
FIG. 12 is a flow chart, from the perspective of the terminal device, of a process of novel synthetic view generation in the framework of a user (virtually) looking into a closed product packaging.

FIG. 12 is a flow chart, from the perspective of the terminal device, of a process of novel synthetic view generation in the framework of a user (virtually) looking into a closed product packaging. In a first step S400 the terminal device performs image recognition on images taken by a camera (160 in FIG. 3, 3 in FIG. 16) of the terminal device to identify the presence of a product packaging located in front of the user. In step S410, by means of image recognition, the position and orientation of the product packaging 400 within the coordinate system of the terminal device is determined. In step S420 a product type of the product within the product packaging is identified with the help of images taken by a camera of the terminal device. This can be achieved by detecting and analyzing e.g. a product code located on the product packaging 400. In the next step S430 the terminal device requests a novel synthetic view, from a service provider, for the product type based on the position, orientation imaging characteristics of terminal device and based on the position and orientation of the product packaging. In the next step S440 a novel synthetic view 440 corresponding to the product type is received by the terminal device. In step S450 the novel synthetic view 440 of the product is presented to the user of the terminal device. In this way, the user can look into the product packaging and virtually sec the product within the product packing from different positions and viewing angels just as if he could look through the packaging.

Figure 13:
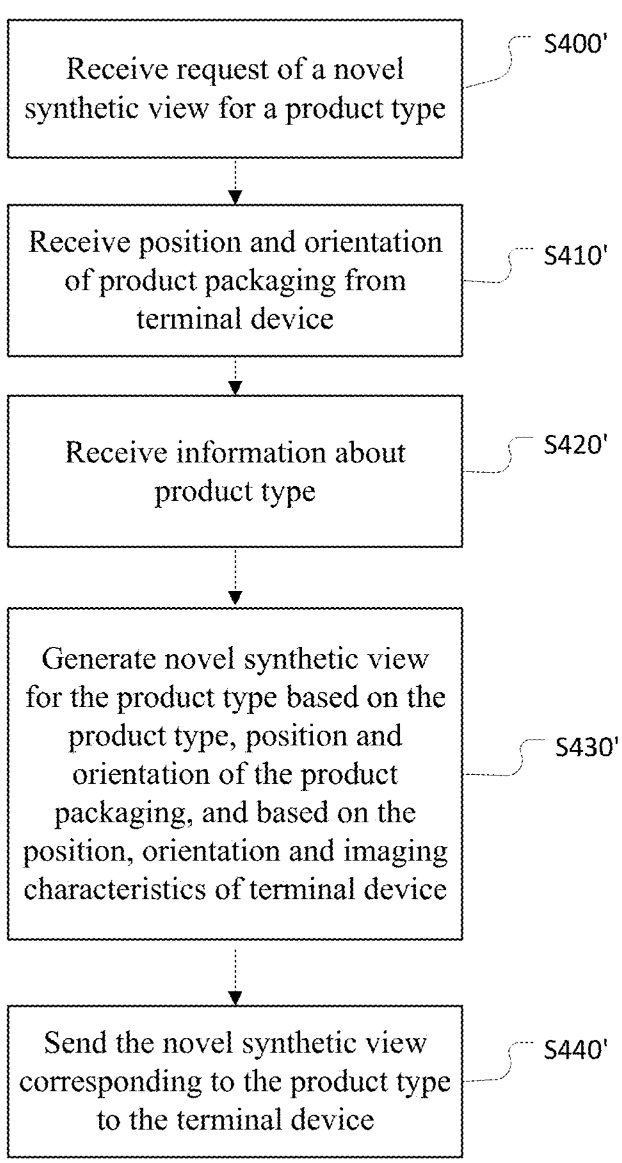
FIG. 13 is a flow chart, from the perspective of the service provider, of a process of novel synthetic view generation in the framework of a user (virtually) looking into a closed product packaging.

FIG. 13 is a flow chart, from the perspective of the service provider, of a process of novel synthetic view generation in the framework of a user (virtually) looking into a closed product packaging. In a first step S400' the service provider receives request of a novel synthetic view for a product type. In a next step S410' the service provider determines a position and orientation of product a packaging and a terminal device. In the next step S420' the service provider receives information about the product type from the terminal device. In the following step S430' the service provider generates a novel synthetic view for the product type based on the position, orientation and imaging characteristics of terminal device and based on the product type, position and orientation of the product packaging. This novel synthetic view corresponding to the product type is then in a last step S440' sent to the terminal device.

Figure 14:
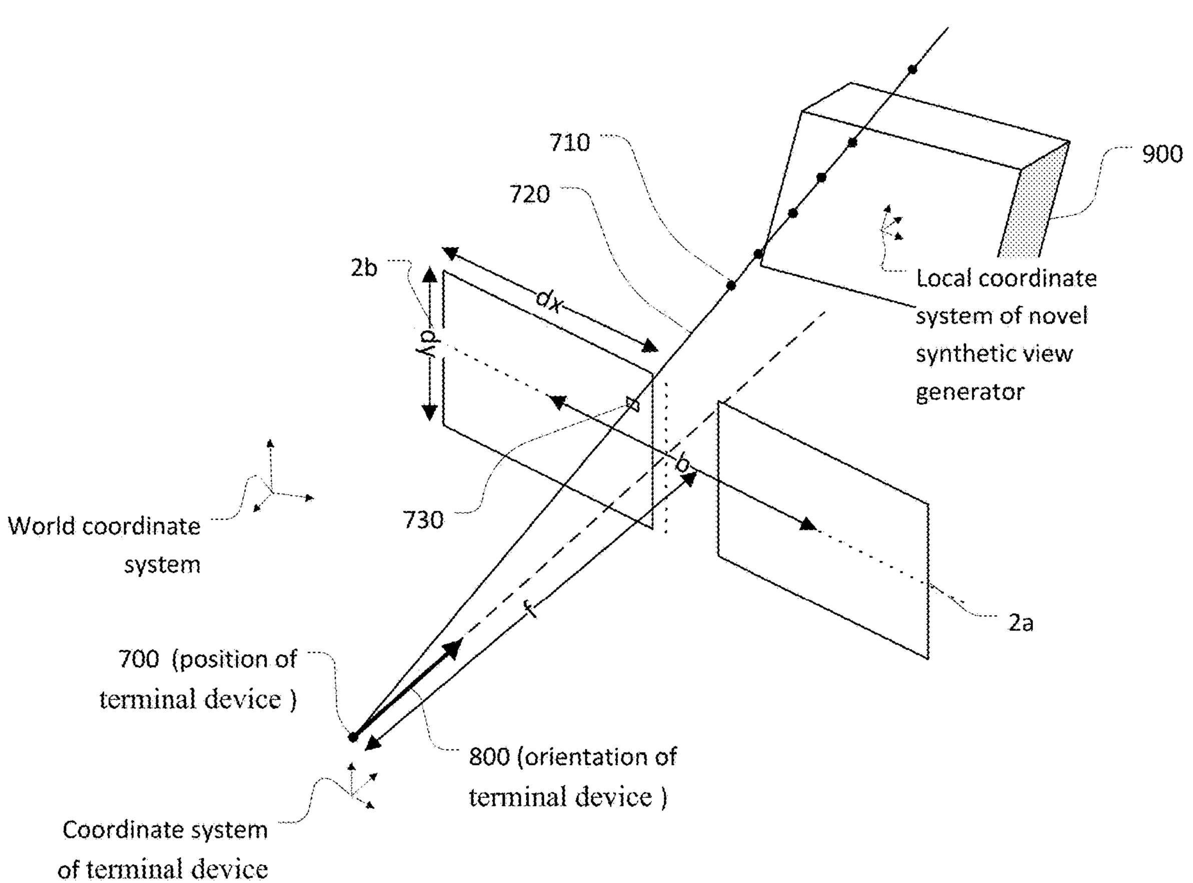
FIG. 14 is a schematic representation of the process of generating a novel synthetic view based on position, orientation, and imaging characteristics of a terminal device.

Example of Novel Synthetic View Generation Based on Position, Orientation and Imaging Characteristics of the Terminal Device FIG. 14 is a schematic representation of the process of generating a novel synthetic view based on position, orientation, and imaging characteristics of a terminal device. The terminal device is located at a position within a world coordinate system. This position defines a viewpoint 700 of the user. The terminal device is oriented in direction 800 which corresponds to the orientation of the terminal device in the world coordinate system. A virtual display area 2*a* for a right eye view and a virtual display area 2*b* for a left eye view is generated in an image plane based on the position 700 and orientation 800 of the terminal device and based on imaging characteristics of the terminal device. These imaging characteristics of the terminal device comprise a focal length which describes the distance of the viewpoint 700 from the image plane, and a baseline b which determines the disparity between the virtual display area for the left eye 2*a* and the virtual display area 2*b* for the right eye. The imaging characteristics of the terminal device may further comprise the dimensions dx and dy of the virtual display areas 2*a* and 2*b* and a pixel density of the virtual display areas 2*a* and 2*b*. This pixel density and the dimensions dx and dy of the virtual display areas 2*a* and 2*b* define the resolution $p_x$, $p_y$ of the virtual display 2*a* and 2*b*.

An object 900 is represented by a novel synthetic view generator that is located at the object's position in the world coordinate system. The object represented by a novel synthetic view generator also has a predefined orientation within the world coordinate system.

By means of the novel synthetic view generator a respective virtual image is generated at the virtual display area 2*a* of the object 900 for the left eye and a respective virtual image is generated at the virtual display area 2*b* of the object 900 for the right eye as observed by a virtual (stereoscopic) camera located at viewpoint 700 and oriented according to orientation 800. This may for example be performed according to the technique set out as disclosed by B. Mildenhall, P. P. Srinivasan, M. Tancik et al. in "NeRF: Representing Scenes as Neural Radiance Fields for View Synthesis", (2020). arXiv.

That is, the viewpoint 700 and each pixel 730 of the virtual display areas 2*a* and 2*b* defines a virtual camera ray 720 which propagates through the scene to generate. This is done pixel by pixel for the virtual display area of the left eye 2*b* and the virtual display area of the right eye 2*a*. For each pixel, the camera ray 720 is fed to the Deep Neural Network (DNN) to sample a set of points 710 along the virtual camera ray. Each point 710 defines a location and viewing direction as denoted 5D coordinates in the NeRF paper. The sampled 5D coordinates are fed into the Deep Neural Network (DNN) to generate a color and a volume density for each sampled coordinate.

Volume rendering techniques as set out in the NeRF paper are used to project the output colors and densities defined by the pixels into an image and synthesize the novel view.

Figure 15:
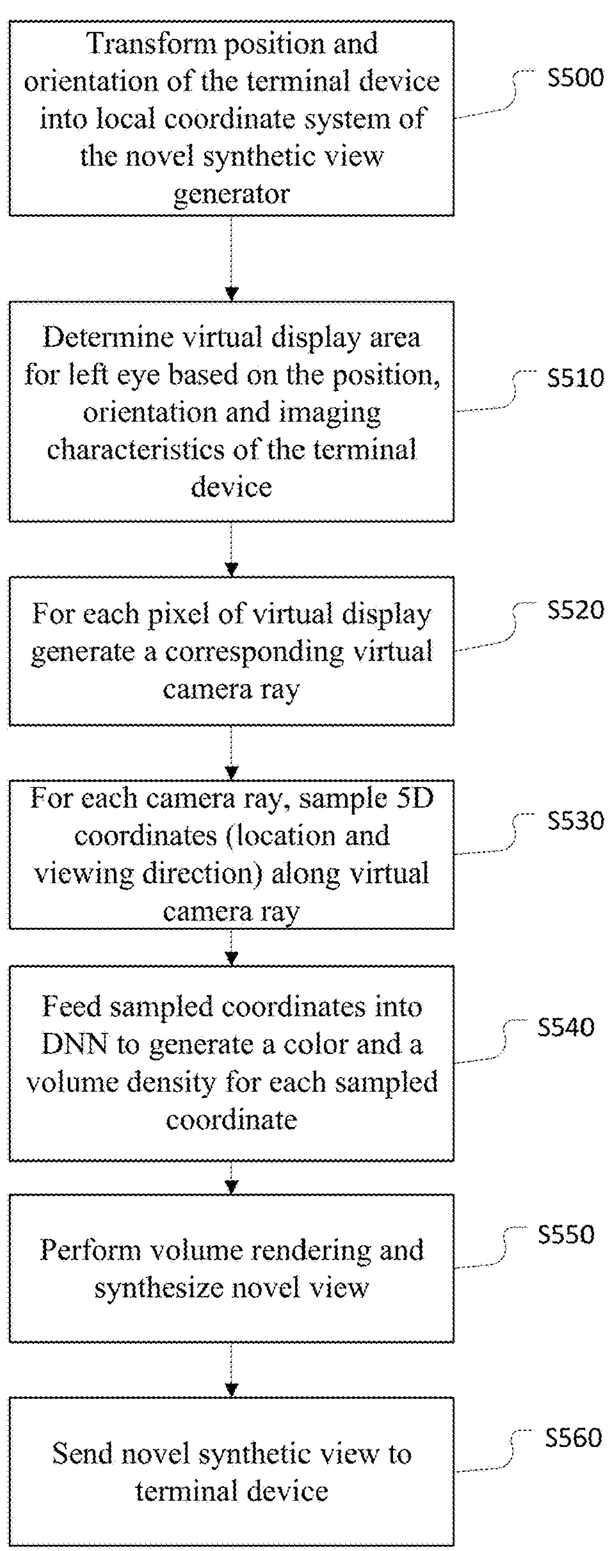
FIG. 15 is a flow chart showing an exemplifying process of generating a novel view synthesis.

FIG. 15 is a flow chart showing an exemplifying process of generating a novel view synthesis. In a first step S500 a position and orientation of a terminal device is transformed into a local coordinate system of the novel synthetic view generator 230. In a step S510 a virtual display area for a left eye is determined based on the position, orientation and imaging characteristics of the terminal device. This may for example be performed as described with regard to FIG. 12 above. In step S520, for each pixel of a virtual display, a corresponding virtual camera ray is generated. In step S530, for each virtual camera ray 5D coordinates (location and viewing direction) are sampled along the virtual camera ray. In step S540 the sampled coordinates are fed into a Deep Neural Network (DNN) to generate a color and a volume density for each sampled coordinate. At step S550 volume rendering techniques are performed to project the output colors and densities into an image and synthesize the novel view. At step S560, the novel synthetic view is sent to the terminal device for presentation to the user.

It should be noted that volume rendering techniques as used in S550 are known to the skilled person. For example, the 2D pixelmap of a novel view may be projected on a 3D representation of the virtual displays 2*a*, 2*b* that can be rendered by the VR engine with conventional means.

In addition or alternatively, based on the relative positions and viewing angle differences between the captured object and the viewpoint of virtual displays 2*a* and 2*b*, the correct viewing angle difference can be determined, and a corresponding request can be sent to the render engine. For static objects, such as items inside the box, shop floor, etc., pre-rendering would be done ahead of time to reduce the computational cost of the renderer. Then just the model captured from the requested viewpoint would be delivered to the device. For real-time object request, renderer would have to synthesize the object from the correct viewing angle.

Example of Internal Configuration of Terminal Device

Figure 16:
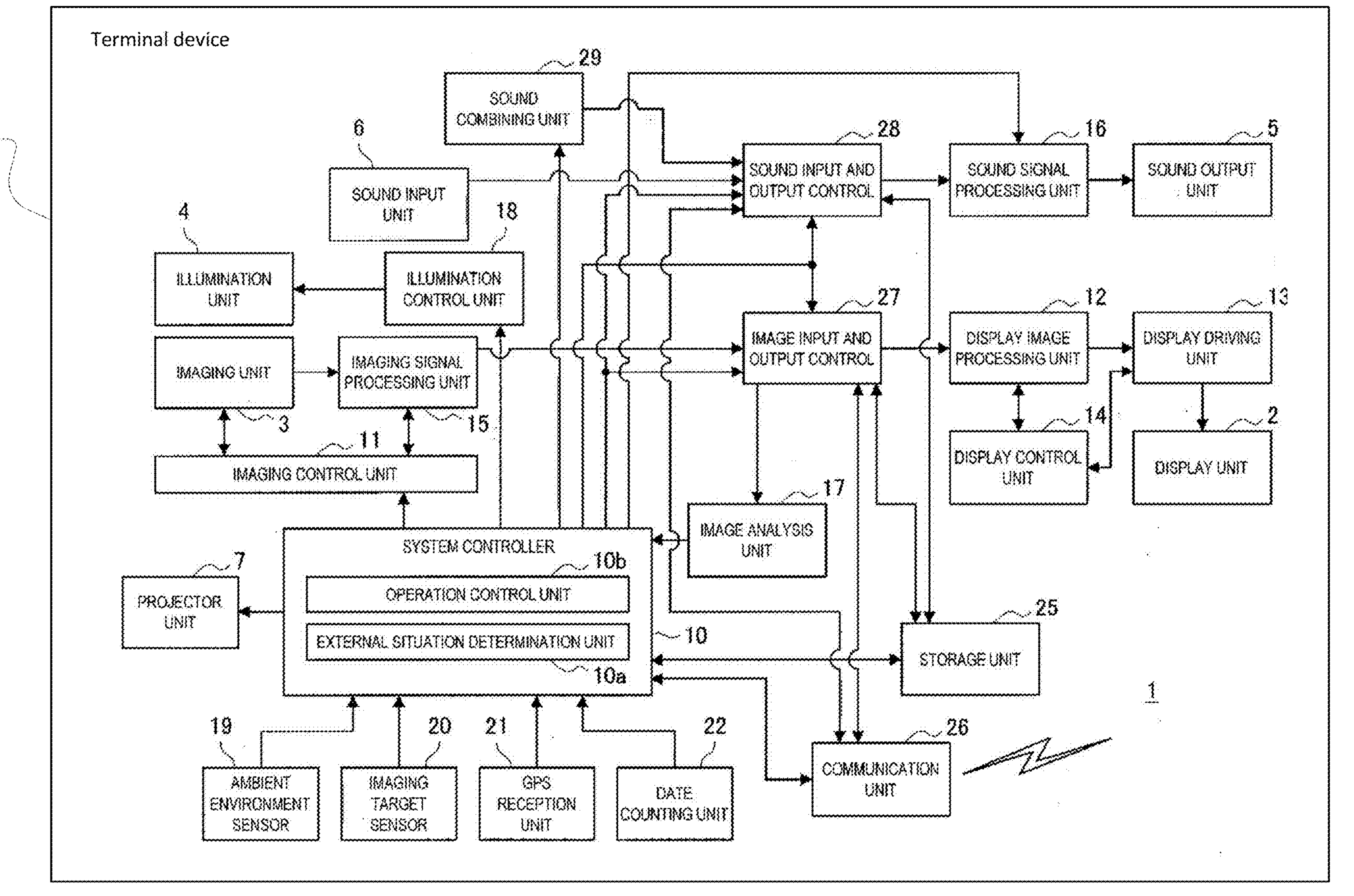
FIG. 16 is a block diagram illustrating an example of the internal configuration of a terminal device.

FIG. 16 is a block diagram illustrating an example of the internal configuration of the terminal device 1 according to the embodiment. The system according to FIG. 16 can execute the processes of FIG. 3. As illustrated in FIG. 16, the terminal device includes a display control unit 2, an imaging unit 3, an illumination unit 4, a sound output unit 5, a sound input unit 6, a projector unit 7, a system controller 10, an imaging control unit 11, a display image processing unit 12, a display driving unit 13, a display control unit 14, an imaging signal processing unit 15, a sound signal processing unit 16, an image analysis unit 17, an illumination control unit 18, an ambient environment sensor 19, an imaging target sensor 20, a GPS reception unit 21, a date counting unit 22, a storage unit 25, a communication unit 26, an image input and output control 27, a sound input and output control 28, a sound combining unit 29.

The system controller 10 is configured by, for example, a microcomputer that includes a central processing unit (CPU), a read-only memory (ROM), a random-access memory (RAM), a nonvolatile memory, and an interface and controls each configuration of the terminal device.

The system controller 10 functions as an external situation determination unit 10*a* that determines an external situation and an operation control unit 10*b* that give a control instruction to each unit according to a determination result of the external situation determination unit 10*a*, as illustrated in FIG. 3.

The external situation determination unit 10*a* acquires external information through the ambient environment sensor 19, the imaging target sensor 20, the GPS reception unit 21, the date counting unit 22, the image analysis unit 17, and the communication unit 26. The external situation determination unit 10*a* may perform control such that illuminance, luminance, or sensitivity of the projector unit 7, the imaging unit 3, or the display unit 2 is adjusted according to the acquired external information (for example, light intensity or a period of time). The external situation determination unit 10*a* according to the embodiment functions as a detection unit that detects at least a part of a substantial object at a position at which a user can perform a manipulation as a manipulation region based on the external information.

Specifically, for example, the external situation determination unit 10*a* (detection unit) extracts a substantial object present within a predetermined distance from the imaging unit 3 based on a captured image (which may be an analysis result obtained by analyzing the captured image by the image analysis unit 17) obtained by the imaging unit 3 imaging the surroundings of the user. The predetermined distance is a distance estimated as a distance in which the user can perform a manipulation (including a touch manipulation and a proximity manipulation) directly or indirectly and is, for example, a distance which a hand of the user reaches or a distance which a manipulator (a pen or an indication rod) held by the user reaches. The substantial object is a target object which exists in the real space which the user can touch. For example, the external situation determination unit 10*a* (detection unit) extracts a desk present in the vicinity of the user, a notebook-type PC placed on a desk, a music reproduction device, or the like as a substantial object. Then, the external situation determination unit 10*a* (detection unit) detects a flat region of at least a part of the extracted substantial object as a manipulation region. For example, when a notebook-type PC placed on a desk in a closed state is extracted as the substantial object, the external situation determination unit 10*a* (detection unit) may detect a top plate portion of the notebook-type PC as a manipulation region.

The operation control unit 10*b* controls an imaging operation or a display operation according to the acquired external information or a determination result by the external situation determination unit 10*a*. The operation control unit 10*b* according to the embodiment functions as a function setting unit that performs setting so that a predetermined function matches (is associated with) the manipulation region detected by the external situation determination unit 10*a* (detection unit).

Specifically, the operation control unit 10*b* (function setting unit) associates the manipulation region with any of the various manipulation functions such as a mouse pad function, a keyboard function, a numeric key function, and a content manipulation function. Alternatively, the operation control unit 10*b* (function setting unit) may associate the manipulation region with a manipulation function similar to the function of the detected substantial object. For example, when a calculator is extracted as the substantial object and a numeric key portion of the calculator is detected as the manipulation region, the operation control unit 10*b* (function setting unit) associates the numeric key function with the manipulation region.

The operation control unit 10*b* functions as a control unit that performs control such that a manipulation unit image (manipulation screen) corresponding to the associated manipulation function is displayed to be superimposed and projected to the manipulation region of the detected substantial object. For example, when a part of a desk is detected as a manipulation region and a keyboard function is associated with the manipulation region, the operation control unit 10*b* (control unit) controls the display unit 2 or the projector unit 7 such that a keyboard image is displayed to be superimposed and projected to the manipulation region. The operation control unit 10*b* can also perform control such that the size of the displayed and projected manipulation unit image matches the size of the manipulation region.

The operation control unit 10*b* functions as a control unit that performs a function matched (associated) with a manipulation region based on a positional relation between the manipulation region and a manipulator. Here, the manipulator may be a part of the body of the user such as a finger or a pen or indication rod held by the user.

More specifically, the operation control unit 10*b* (control unit) recognizes the positional relation between the manipulation region and the manipulator based on external information (for example, a captured image) and determines whether the manipulator overlaps the manipulation region for a predetermined time. Then, when the manipulator overlaps the manipulation region for the predetermined time, the operation control unit 10*b* (control unit) performs the manipulation function associated with the manipulation region, that is, receives a manipulation input performed by the user.

For example, when the mouse pad function is associated with the manipulation region, the operation control unit 10*b* (control unit) controls a display position of a mouse pointer displayed in the display unit 2 according to a motion of the user's finger on the manipulation region. For example, when the keyboard function is associated with the manipulation region, the operation control unit 10*b* (control unit) executes a text input based on a relation between the position of each key of the manipulation region and the position of the user's finger.

Thus, when the user manipulates the hands-free terminal device, the user can perform a manipulation input of touching a substantial object present in the real space. The user can perform a manipulation input, such as a mouse manipulation or a keyboard input, with a motion to which users are generally accustomed. When a predetermined flat region of a substantial object is utilized as a manipulation unit, it is not necessary to connect the substantial object to the terminal device electrically or physically, and thus communication connection or wiring between the substantial object and the terminal device is not necessary. Further, it is not necessary to transmit input data from the substantial object to the terminal device either. Therefore, even when the substantial object is, for example, a wireless keyboard or mouse, it is not necessary to feed power. Even when the substantial object is a broken keyboard or mouse, the broken keyboard or mouse can be used as a manipulation input device as long as a manipulation region can be detected by the terminal device and can be associated with a manipulation function. Therefore, ultimate recycling can be realized.

The imaging unit 3 includes a lens system that includes an imaging lens 3*a*, a diaphragm, a zoom lens, and a focus lens, a driving system that enables the lens system to execute a focus operation or a zoom operation, and a solid-state image sensor array that photoelectrically converts imaging light obtained with the lens system to generate an imaging signal. The solid-state image sensor array may be realized by, for example, a charge coupled device (CCD), a sensor array, or a complementary metal oxide semiconductor (CMOS) sensor array. As illustrated in FIG. 2, since the imaging lens 3*a* is disposed toward the front side to execute imaging with a view direction of the user set as a subject direction when the terminal device is mounted on the user, the imaging unit 3 can image a range including the field of vision that the user sees through the display unit 2.

The imaging signal processing unit 15 includes a sample-hold and automatic gain control (AGC) circuit that performs gain adjustment or waveform shaping on a signal obtained by a solid-state image sensor of the imaging unit 3 or a video analog-to-digital (A-to-D) converter. Thus, the imaging signal processing unit 15 obtains an imaging signal as digital data. The imaging signal processing unit 15 performs a white balance process, a luminance process, a color signal process, a blur correction process, or the like on the imaging signal.

The imaging control unit controls the operations of the imaging unit 3 and the imaging signal processing unit 15 based on an instruction from the system controller 10. For example, the imaging control unit 11 controls ON and OFF of the operations of the imaging unit 3 and the imaging signal processing unit 15. The imaging control unit 11 is considered to perform control (motor control) on the imaging unit 3 in order to execute operations such as auto-focus, automatic exposure adjustment, diaphragm adjustment, and zoom. The imaging control unit 11 includes a timing generator and controls signal processing operations of the video A-to-D converter and the solid-state image sensor and the sample-hold and AGC circuit of the imaging signal processing unit 15 based on a timing signal generated by the timing generator. Variable control of an imaging frame rate is considered to be performed by the timing control.

The imaging control unit 11 performs control of imaging sensitivity or signal processing in the solid-state imaging element and the imaging signal processing unit 15. For example, as the control of the imaging sensitivity, gain control of a signal read from the solid-state image sensor can be performed. Alternatively, control of various coefficients of imaging signal processing at a digital data stage, black level setting control, correction amount control in a blur correction process, or the like can be performed. For the imaging sensitivity, for example, entire sensitivity adjustment in which a wavelength band is not particularly considered or sensitivity adjustment (for example, imaging in which a specific wavelength band is cut) in which imaging sensitivity of a specific wavelength band is adjusted in, for example, an infrared region or an ultraviolet region can be performed. Sensitivity adjustment according to a wavelength can be performed through inversion of a wavelength filter in the imaging lens system or a wavelength filter calculation process on an imaging signal. In this case, the imaging control unit 11 can perform sensitivity control through insertion control of a wavelength filter, designation of a filter calculation coefficient, or the like.

The imaging signal (image data obtained by imaging) imaged by the imaging unit 3 and processed by the imaging signal processing unit 15 is supplied to the image input and output control 27. The image input and output control 27 controls transmission of the image data under the control of the system controller 10. That is, transmission of the image data is controlled among an imaging system (the imaging signal processing unit 15), a display system (the display image processing unit 12), the storage unit 25, and the communication unit 26.

For example, the image input and output control 27 performs an operation of supplying the image data which is the imaging signal processed by the imaging signal processing unit 15 to the display image processing unit 12, the storage unit 25, or the communication unit 26.

The image input and output control 27 performs an operation of supplying, for example, the image data reproduced from the storage unit 25 to the display image processing unit 12 or the communication unit 26. The image input and output control 27 performs an operation of supplying, for example, the image data received by the communication unit 26 to the display image processing unit 12 or the storage unit 25.

The display image processing unit 12 is considered as, for example, a so-called video processor and is considered to be a unit which can perform various display processes on the supplied image data. For example, luminance level adjustment, color correction, contrast adjustment, or sharpness (contour enhancement) adjustment of the image data can be performed.

The display driving unit 13 includes a pixel driving circuit that displays the image data supplied from the display image processing unit 12 on the display unit 2 considered as, for example, a liquid crystal display. That is, display is performed by applying a driving signal based on a video signal to each of the pixels arranged in a matrix form in the display unit 2 at predetermined horizontal and vertical driving timings. The display driving unit 13 can control the transmittance of each of the pixels of the display unit 2 such that the pixels enter a through state. The display driving unit 13 may allow a part of the display unit 2 to enter the through state and display AR information in the part thereof.

The display control unit 14 controls a processing operation of the display image processing unit 12 or an operation of the display driving unit 13 under the control of the system controller 10. Specifically, the display control unit 14 performs control such that the display image processing unit 12 performs the luminance level adjustment and the like on the image data described above. The display control unit 14 performs control such that the display driving unit 13 changes the through state and an image display state of the display unit 2.

The sound input unit 6 includes the microphones 6*a* and 6*b* illustrated in FIG. 2, and a microphone amplifier unit and an A-to-D converter that amplify and process sound signals obtained by the microphones 6*a* and 6*b*. The sound input unit 6 outputs sound data to the sound input and output control 28.

The sound input and output control 28 controls transmission of the sound data under the control of the system controller 10. Specifically, the sound input and output control 28 controls transmission of the sound signals among the sound input unit 6, the sound signal processing unit 16, the storage unit 25, and the communication unit 26. For example, the sound input and output control 28 performs an operation of supplying the sound data obtained by the sound input unit 6 to the sound signal processing unit 16, the storage unit 25, or the communication unit 26.

The sound input and output control 28 performs an operation of supplying, for example, the sound data reproduced by the storage unit 25 to the sound signal processing unit 16 or the communication unit 26. The sound input and output control 28 performs an operation of supplying, for example, the sound data received by the communication unit 26 to the sound signal processing unit 16 or the storage unit 25.

The sound signal processing unit 16 is formed by, for example, a digital signal processor or a D-to-A converter. The sound signal processing unit 16 is supplied with the sound data obtained by the sound input unit 6 or the sound data from the storage unit 25 or the communication unit 26 via the sound input and output control 28. The sound signal processing unit 16 performs a process such as volume adjustment, sound quality adjustment, or an acoustic effect on the supplied sound data under the control of the system controller 10. The processed sound data is converted into an analog signal to be supplied to the sound output unit 5. The sound signal processing unit 16 is not limited to the configuration in which the digital signal processing is performed but may perform signal processing using an analog amplifier or an analog filter.

The sound output unit 5 includes one pair of earphone speakers 5*a* illustrated in FIG. 2 and amplifier circuits for the earphone speakers 5*a*. The sound output unit 5 may be configured as a so-called bone conduction speaker. The user can hear an external sound through the sound output unit 5, hear a sound reproduced by the storage unit 25, or hear a sound received by the communication unit 26.

The storage unit 25 is considered to be a unit that records and reproduces data on a predetermined recording medium. The storage unit 25 is realized as, for example, a hard disk drive (HDD). Of course, the recording medium can be considered as any of various media such as a solid-state memory such as a flash memory, a memory card including a fixed memory, an optical disc, a magneto-optical disc, and a hologram memory. The storage unit 25 may be considered to have a configuration in which recording and reproduction can be performed according to an adopted recording medium.

The storage unit 25 is supplied with image data captured by the imaging unit 3 and processed as an imaging signal by the imaging signal processing unit 15 or with image data received by the communication unit 26 via the image input and output control 27. The storage unit 25 is supplied with sound data obtained by the sound input unit 6 or sound data received by the communication unit 26 via the sound input and output control 28.

The storage unit 25 records the supplied image data and sound data by performing an encoding process on the image data and the sound data for the purpose of recording on a recording medium and recording the image data and the sound data on the recording medium under control of the system controller 10. The storage unit 25 reproduces the image data and the sound data from the recording medium under the control of the system controller 10. The reproduced image data is output to the image input and output control 27 and the reproduced sound data is output to the sound input and output control 28.

The communication unit 26 performs transmission and reception of data with an external device. The communication unit 26 is an example of the configuration for acquiring external information. The communication unit 26 may be configured to perform network communication through near field communication with, for example, a network access point in conformity with a scheme such as wireless LAN or Bluetooth or may be configured to perform wireless communication directly with an external device having a corresponding communication function.

The external device is assumed to be any device having information processing and communication functions, such as a computer device, a PDA, a portable telephone terminal, a smartphone, a video device, an audio device, and a tuner device. Also, the communication target external device is assumed to be a terminal device, a server device, or the like connected to a network such as the Internet. By setting a contactless communication IC card including an IC chip, a two-dimensional barcode such as a QR code, a hologram memory, or the like as an external device, the communication unit 26 can also be considered to read information from such an external device. Another terminal device is also assumed as an external device.

The communication unit 26 is supplied with image data captured by the imaging unit 3 and processed as an imaging signal by the imaging signal processing unit 15 and image data reproduced by the storage unit 25 via the image input and output control 27. The communication unit 26 is supplied with sound data obtained by the sound input unit 6 or sound data reproduced by the storage unit 25 via the sound input and output control 28.

The communication unit 26 performs an encoding process, a modulation process, and the like on the supplied image data and sound data for transmission and transmits the processed image data and sound data to an external terminal device under the control of the system controller 10. The communication unit 26 performs a data reception operation from an external terminal device. The received and demodulated image data is output to the image input and output control 27 and the received and demodulated sound data is output to the sound input and output control 28.

The sound combining unit 27 performs sound combining under the control of the system controller 10 and outputs the sound signal. The sound signal output from the sound combining unit 27 is supplied to the sound signal processing unit 16 via the sound input and output control 28 to be processed, and then is supplied to the sound output unit 5 to be output as a sound to the user.

The illumination unit 4 includes a light-emitting unit **4*a* illustrated in FIG. 2 and a light-emitting circuit that allows the light-emitting unit 4*a* (for example, an LED) to emit light. The illumination control unit 18 allows the illumination unit 4 to perform a light emitting operation under the control of the system controller 10. The light-emitting unit 4*a* of the illumination unit 4 is mounted to perform illumination on the front side, as illustrated in FIG. 2, and thus the illumination unit 4** performs an illumination operation in a visual field direction of the user.

The ambient environment sensor 19 is an example of the configuration for acquiring external information. Specifically, for example, the ambient environment sensor 19 is assumed to be an illuminance sensor, a temperature sensor, a humidity sensor, or a pressure sensor. The ambient environment sensor 19 is considered to be a sensor that obtains information to detect ambient brightness, temperature, humidity, weather, or the like as the ambient environment of the terminal device.

The imaging target sensor 20 is an example of the configuration for acquiring external information. Specifically, the imaging target sensor 20 is a sensor that detects information regarding an imaging target which is a subject of an imaging operation by the imaging unit 3. For example, a sensor that detects information such as a specific wavelength of infrared light or energy emitted from an imaging target, such as a distance measurement sensor detecting information regarding a distance from the terminal device to the imaging target or an infrared sensor such as a pyroelectric sensor, is assumed. In the case of the pyroelectric sensor, for example, whether the imaging target is a living body such as a person or an animal can be detected. A sensor that detects information regarding a specific wavelength of ultraviolet light or energy emitted from the imaging target, such as any of the various ultraviolet (UV) sensors, is also assumed. In this case, for example, whether the imaging target is a fluorescent material, or a phosphor can be detected or the amount of external ultraviolet light necessary for anti-sunburn measures can be detected.

The GPS reception unit 21 is an example of the configuration for acquiring external information. Specifically, the GPS reception unit 21 receives radio waves from satellites of the Global Positioning System (GPS) and outputs information regarding a latitude and longitude as a current position.

The date counting unit 22 is an example of the configuration for acquiring external information. The date counting unit 22 counts a date (year, month, day, hour, minute, and second) as a so-called clock unit and outputs current date information.

The image analysis unit 17 is an example of the configuration for acquiring external information. Specifically, the image analysis unit 17 analyzes the image data and obtains information regarding an image included in the image data. The image analysis unit 17 is supplied with image data via the image input and output control 27. The image data which is a target of the image analysis in the image analysis unit 17 is the image data which is a captured image obtained by the imaging unit 3 and the imaging signal processing unit 15, the image data received by the communication unit 26, or the image data reproduced from the recording medium by the storage unit 25.

The internal configuration of the terminal device according to the embodiment has been described in detail above.

The ambient environment sensor 19, the imaging target sensor 20, the GPS reception unit 21, the date counting unit 22, the image analysis unit 17, and the communication unit 26 have been described as the configuration for acquiring the external information, but not all of them are necessarily included. Another sensor such as a sound analysis unit that detects and analyzes an ambient sound may be installed.

Example of Internal Configuration of Server Device

Figure 17:
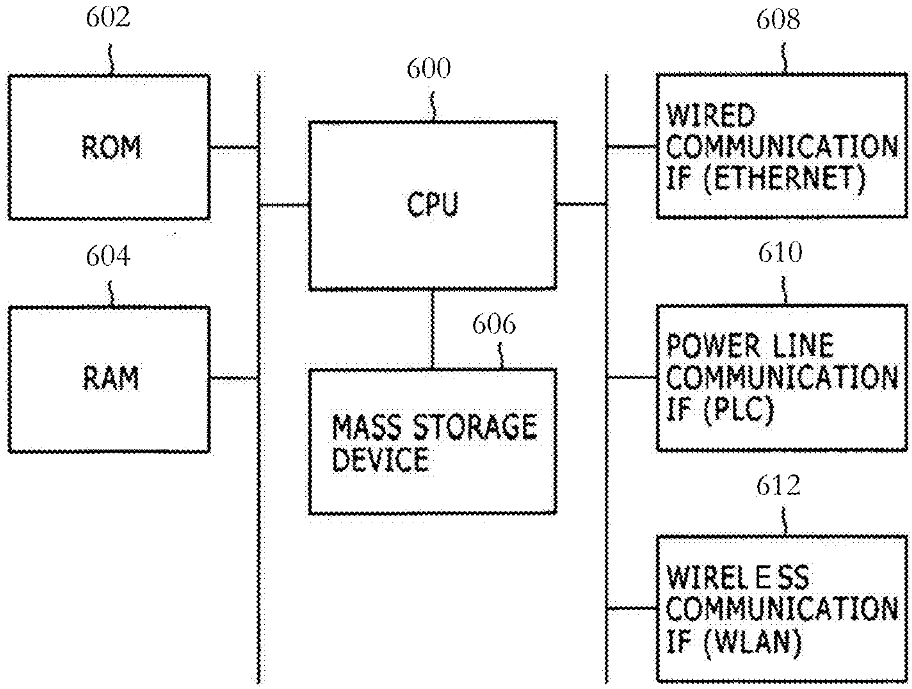
FIG. 17 is a block diagram illustrating an example of the internal configuration of a service provider which may provide a novel synthetic view as described above to a terminal device.

FIG. 17 is a block diagram illustrating an example of the internal configuration of a service provider (30 in FIG. 4) which may provide a novel synthetic view as described above to a terminal device. The CPU 600 is able to execute the processes of FIG. 4.

The server includes a central processing unit (CPU) 600, a read only memory (ROM) 602, a random access memory (RAM) 604, a mass storage device 606, an Ethernet (registered trade-mark) controller 608 as the wired LAN interface, a PLC controller 610 as the power line communication interface, a wireless controller 612 as the wireless LAN interface. The interfaces 608, 610, and 612 for the Ethernet (registered trademark), the power line communication (PLC), and the wireless LAN may implement the functions of the communication interface (220 in FIG. 4) of the server.

The CPU 600 executes a predetermined program code to control an overall operation of the server by software processing in a centralized manner. The CPU 600 may, e.g., control the functions of the novel synthetic view generator (230 in FIG. 4), of the image analysis unit (260 in FIG. 4), of the layer database (240 in FIG. 4) and of the layer management (250 in FIG. 4) of the server.

The ROM 602 is a nonvolatile memory that stores an initial boot program, initial boot data, and so on. The RAM 604 is a main memory. The CPU 600 performs various processes in accordance with a program deployed in the RAM 604.

The mass storage device 606 is formed by a hard disk, a high-capacity flash memory, various types of memory cards, or the like, for example. The mass storage device 606 is used to store an additional software program, a data file, or the like. The mass storage device 606 may, e.g., store the novel synthetic view generator (230 in FIG. 4).

The interfaces 608, 610, and 612 for the Ethernet (registered trademark), the power line communication (PLC), and the wireless LAN are connected to the CPU 600 via a peripheral component interface bus, such as peripheral component interconnect (PCI). Note that the functional blocks 600, 602, 604 and 606 are not limited to the units as shown in FIG. 17, as long as combining and bridging of the communication interfaces 608, 610, and 612 can be achieved.

It should be noted that the description above is only an example configuration. Alternative configurations may be implemented with additional or other units, sensors, or the like.

It should also be noted that the division of the systems into units is only made for illustration purposes and that the present disclosure is not limited to any specific division of functions in specific units.

It should also be recognized that the embodiments describe methods with an exemplary ordering of method steps. The specific ordering of method steps is, however, given for illustrative purposes only and should not be construed as binding.

All units and entities described in this specification and claimed in the appended claims can, if not stated otherwise, be implemented as integrated circuit logic, for example, on a chip, in FPGA, or the like, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Additionally, the present technology may also be configured as below.

[1] A terminal device (1) comprising circuitry configured to obtain a novel synthetic view based on a position and orientation of the terminal device (1) and to display the novel synthetic view to a user of the terminal device (1).

[2] The terminal device (1) of [1], wherein the novel synthetic view is generated by a novel synthetic view generator (230) that is configured to generate the novel synthetic view based on the position and orientation of the terminal device (1).

[3] The terminal device of (1) by any of [1] or [2], wherein the novel synthetic view generator (230) represents an object, a specific location, a room, or a shop.

[4] The terminal device (1) by anyone of [1] to [3], wherein the novel synthetic view allows a user of the terminal device (1) to see through walls.

[5] The terminal device (1) by anyone of [1] to [4], wherein the novel synthetic view allows a user of the look into a product packaging (400).

[6] The terminal device (1) by anyone of [1] to [5], wherein the circuitry is configured to recognize an obstructed area within an image obtained by a camera (3) of the terminal device (1) and wherein the novel synthetic view is representative of the obstruction area.

[7] The terminal device (1) by anyone of [1] to [6], wherein the novel synthetic view is an updated synthetic view.

[8] The terminal device (1) by anyone of [1] to [7], wherein the circuitry is configured to obtain the novel synthetic view based on imaging characteristics of the terminal device (1).

[9] The terminal device (1 by anyone of [1] to [8], wherein the imaging characteristics comprise at least one of focal length, display size, and number of pixels.

[10] The terminal device (1) by anyone of [1] to [9], wherein the terminal device (1) is a smartglasses device.

[11] The terminal device (1) by anyone of [1] to [10], wherein the circuitry is configured to obtain, based on the position and orientation of the terminal device (1), a novel synthetic view for a left eye display and a novel synthetic view for a right eye display.

[12] The terminal device (1) by anyone of [1] to [11], wherein the novel synthetic view is associated with a layer selected from a group of predefined layers.

[13] The terminal device (1) of [12], wherein each layer is associated with at least one novel synthetic view generator (230).

[14] The terminal device (1) by anyone of [12] or [13], wherein the circuitry is configured to select the layer based on the position and orientation of the terminal device (1) and/or based on information obtained by eye tracking.

[15] The terminal device (1) by anyone of [12] to [14], wherein the circuitry is configured to provide selection means to the user, the selection means comprising a virtual menu presented to the user or means that analyses voice input of the user.

[16] A service comprising circuitry configured to generate a novel synthetic view based on a position and orientation of a terminal device (1) and to display the novel synthetic view to the user via a display of the terminal device (1).

[17] The service of [16], wherein the circuitry implements a novel synthetic view generator (230) that is configured to generate the novel synthetic view based on the position and orientation of the terminal device (1).

[18] The service by any of [16] or [17], wherein a novel synthetic view generator (230) represents an object or room.

[19] The terminal device (1) by anyone of [1]-[15], wherein the novel synthetic view allows a user of the terminal device (1) to see through walls.

[20] The terminal device (1) by anyone of [1]-[15], wherein the novel synthetic view allows a user of the look into a product packaging.

[21] The service by anyone of [16]-[18], wherein the novel synthetic view generator (230) is configured to generate a color value and a color density based on a viewing position and a beam direction.

[22] The service by anyone of [16]-[18], wherein the circuitry implements multiple novel synthetic view generators (230), wherein each novel synthetic view generator (230) is associated with a specific layer of a group of predefined layers.

[23] The service by anyone of [16]-[18], wherein the terminal device (1) is a device as defined in 1.

[24] A method comprising:

obtaining a novel synthetic view based on a position and orientation of the terminal device (1) and displaying the novel synthetic view to a user of the terminal device (1).

[25] A method comprising:

generating a novel synthetic view based on a position and orientation of a terminal device (1) and displaying the novel synthetic view to the user via a display of the terminal device (1).

[26] A computer program comprising instructions which, when the program is executed by a processor, cause the processor to carry out the methods of [24] and [25].

REFERENCE SIGNS

1 Terminal device
2 Display unit
2*a, b* Virtual display area
3 Imaging unit
3*a* Imaging lens
4 Illumination unit
5 Sound output unit
5*a* Earphone speaker
6 Sound input unit
6*a, b* Microphone
7 Projector unit
10 System controller
10*a* External situation determination unit
10*b* Operation control unit
11 Imaging control unit
12 Display image processing unit
13 Display driving unit
14 Display control unit
15 Imaging signal processing unit
16 Sound signal processing unit
17 Image analysis unit
18 Illumination control unit
19 Ambient environment sensor
20 Imaging target sensor
21 GPS reception unit
22 Date counting unit
25 Storage unit
26 Communication unit
27 Image input and output control
28 Sound input and output control
29 Sound combining unit
30 Service provider
40 Network
120 Communication interface terminal device
130 Tracking unit
140 Display control unit
150 VR unit
160 Imaging unit
170 Image processing unit
180 User interface
190 Layer management
220 Communication interface
230 Novel synthetic view generator
240 Layer database
250 Layer management
260 Image analysis unit
400 Product packaging
410 Toy car
430 Barcode
440*a* Novel synthetic view of the toy car (side view)
440*b* Novel synthetic view of the toy car (front view)
500 Shopping mall
510 Novel synthetic view of shop A
520 Novel synthetic view of shop B
530, 540 Novel synthetic view of entrance
300 Communication network
600 Processor (CPU)
610 Multiple cameras
620 Three people
630 Actor
640 Novel synthetic view of the live event
650 Stage
602 ROM
604 RAM
606 Mass storage device
608 Wired communication IF (Ethernet)
610 Power line communication IF (PLC)
612 Wireless communication IF (WLAN)
700 Position of terminal device
710 Set of points sampled along a virtual camera ray
720 Camera ray
730 Pixel of virtual display area
800 Orientation of terminal device
900 Object represented by a novel synthetic view generator

The invention claimed is:

1. A terminal device comprising:

circuitry configured to generate, by a neural network that outputs a color value and a volume density based on a viewing position and a beam direction, a novel synthetic view based on a position and orientation of the terminal device; and display the novel synthetic view to a user of the terminal device.

2. The terminal device of claim 1 wherein the circuitry is configured to generate the novel synthetic view based on the position and orientation of the terminal device and based on imaging characteristics of the terminal device.

3. The terminal device of claim 1 wherein the novel synthetic view generator represents an object, a specific location, a room, or a shop.

4. The terminal device of claim 1 wherein the novel synthetic view allows a user of the terminal device to see through walls.

5. The terminal device of claim 1 wherein the novel synthetic view allows a user of the look into a product packaging.

6. The terminal device of claim 1, wherein the circuitry is configured to recognize an obstructed area within an image obtained by a camera of the terminal device and wherein the novel synthetic view is representative of the obstruction area.

7. The terminal device of claim 1 wherein the novel synthetic view is an updated synthetic view.

8. The terminal device of claim 1 wherein the circuitry is configured to generate the novel synthetic view based on imaging characteristics of the terminal device.

9. The terminal device of claim 8 wherein the imaging characteristics comprise at least one of focal length, display size, and number of pixels.

10. The terminal device of claim 1 wherein the terminal device is a smartglasses device.

11. The terminal device of claim 1, wherein the circuitry is configured to generate, based on the position and orientation of the terminal device, a novel synthetic view for a left eye display and a novel synthetic view for a right eye display.

12. The terminal device of claim 1, wherein the novel synthetic view is associated with a layer selected from a group of predefined layers.

13. The terminal device of claim 12, wherein each layer is associated with at least one neural network configured to generate the novel synthetic view.

14. The terminal device of claim 12 wherein the circuitry is configured to select the layer based on the position and orientation of the terminal device and/or based on information obtained by eye tracking.

15. The terminal device of claim 12 wherein the circuitry is configured to provide selection means to the user, the selection means comprising a virtual menu presented to the user or means that analyses voice input of the user.

16. The terminal device according to claim 1, wherein the circuitry is configured to:

generate, for each pixel of a display of the terminal device, a virtual camera ray based on the position and orientation of the terminal device;

sample a plurality of points along the virtual camera ray, each point defining a 5D coordinate comprising a spatial location and a viewing direction;

input the 5D coordinates into the neural network to generate the color value and the volume density for each of the plurality of points; and apply volume rendering to project the color values and volume densities of the plurality of points into the novel synthetic view.

17. A service comprising:

circuitry configured to generate, by a neural network that outputs a color value and a volume density based on a viewing position and a beam direction, a novel synthetic view based on a position and orientation of a terminal device; and display the novel synthetic view to the user via a display of the terminal device.

18. The service of claim 17 wherein the circuitry implements the neural network, the neural network configured to generate the novel synthetic view based on the position and orientation of the terminal device.

19. The service of claim 17 wherein the neural network represents an object or room.

20. A method comprising:

generating by a neural network that outputs a color value and a volume density based on a viewing position and a beam direction, a novel synthetic view based on a position and orientation of a terminal device; and displaying the novel synthetic view to a user of the terminal device.

* * * * *